US008644404B2

(12) United States Patent
Mashino et al.

(10) Patent No.: US 8,644,404 B2
(45) Date of Patent: Feb. 4, 2014

(54) WIRELESS COMMUNICATION SYSTEM AND WIRELESS COMMUNICATION METHOD

(75) Inventors: Jun Mashino, Yokosuka (JP); Takatoshi Sugiyama, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 211 days.

(21) Appl. No.: 13/133,312

(22) PCT Filed: Dec. 18, 2009

(86) PCT No.: PCT/JP2009/007021
§ 371 (c)(1),
(2), (4) Date: Jun. 7, 2011

(87) PCT Pub. No.: WO2010/070925
PCT Pub. Date: Jun. 24, 2010

(65) Prior Publication Data
US 2011/0243268 A1  Oct. 6, 2011

(30) Foreign Application Priority Data

Dec. 19, 2008 (JP) ................................ 2008-324412
Mar. 3, 2009 (JP) ................................ 2009-049785

(51) Int. Cl.
*H04K 1/10* (2006.01)
(52) U.S. Cl.
USPC ........... 375/260; 375/285; 375/355; 375/316; 375/262
(58) Field of Classification Search
USPC ................................................ 375/260, 285
See application file for complete search history.

(56) References Cited

U.S. PATENT DOCUMENTS

| 7,149,266 B1 * | 12/2006 | Imamura et al. ............... 375/355 |
| 2005/0208906 A1 | 9/2005 | Miyoshi et al. |
| 2007/0058693 A1 * | 3/2007 | Aytur et al. .................... 375/130 |

FOREIGN PATENT DOCUMENTS

| EP | 2 110 974 A1 | 10/2009 |
| JP | 2004-129249 A | 4/2004 |
| JP | 2007-282120 | 10/2007 |
| JP | 2007-312114 | 11/2007 |
| WO | 2007/102626 A1 | 9/2007 |
| WO | WO-2008-099785 A1 | 8/2008 |
| WO | 2010/064438 A1 | 6/2010 |
| WO | 2010/070898 A1 | 6/2010 |

OTHER PUBLICATIONS

Notice of Reasons for Rejection, Japanese Patent Application No. 2010-542888, Nov. 13, 2012.

(Continued)

*Primary Examiner* — Lihong Yu
(74) *Attorney, Agent, or Firm* — Harness, Dickey & Pierce, P.L.C.

(57) ABSTRACT

In a wireless communication system including a transmitter device and a receiver device used for transmission of wireless signals having a plurality of sub-carriers, the transmitter device performs error correction coding on transmitting data and selects at least one of the plurality of sub-carriers used for transmission of error-correction coded data as a null sub-carrier having zero amplitude, thus transmitting the error-correction coded data, while the receiver device receives signals having the plurality of sub-carriers from the transmitter device so as to retrieve original transmitted data by implementing error correction decoding on received signals, thus determining whether an interference wave occurs in the sub-carrier upon detecting reception power exceeding a predetermined threshold in the sub-carrier serving as the null sub-carrier.

19 Claims, 18 Drawing Sheets

(56) References Cited

OTHER PUBLICATIONS

Irie, Yuji, et al., "A Deliberate Subcarrier Puncture for OFDM Signals," Proceedings of the 2003 IEICE Society Conferences, Communications 1, B-5-197, Mar. 3, 2003, p. 656.

Kusumoto, Yukiko, et al., "The Transmission Performance on the OFDM system with Punctured Convolutional Coding," Proceedings of the 1998 IEICE Society Conferences, Communications 1, B-5-13, Mar. 6, 1998, p. 377.

Mashino, Jun, et al. "Frequency Utilization Efficiency Improvement by Cyclic FEC Decoding in Superposed Multicarrier Transmission," IEICE Technical Report, RCS2008-132, vol. 108, No. 305, Nov. 12, 2008, pp. 13-18.

Mashino, Jun, et al. "Frequency Utilization Efficiency Improvement by Superposed Multicarrier Transmission Scheme," IEICE Technical Report, RCS2008-67, vol. 108, No. 188, Aug. 8, 2008, pp. 85-90.

Mashino, Jun, et al., "An Interference Suppression Scheme using FEC Metric Masking for Superposed Multi-Carrier Transmission," Proceedings of the 2008 IEICE Society Conferences 1, B-5-83, Sep. 2, 2008, p. 396.

Notice of Reasons for Rejection, Japanese Patent Application No. 2010-542888, Feb. 12, 2013.

Office Action, Chinese Patent Application No. 200980149147.4, Aug. 23, 2013.

\* cited by examiner

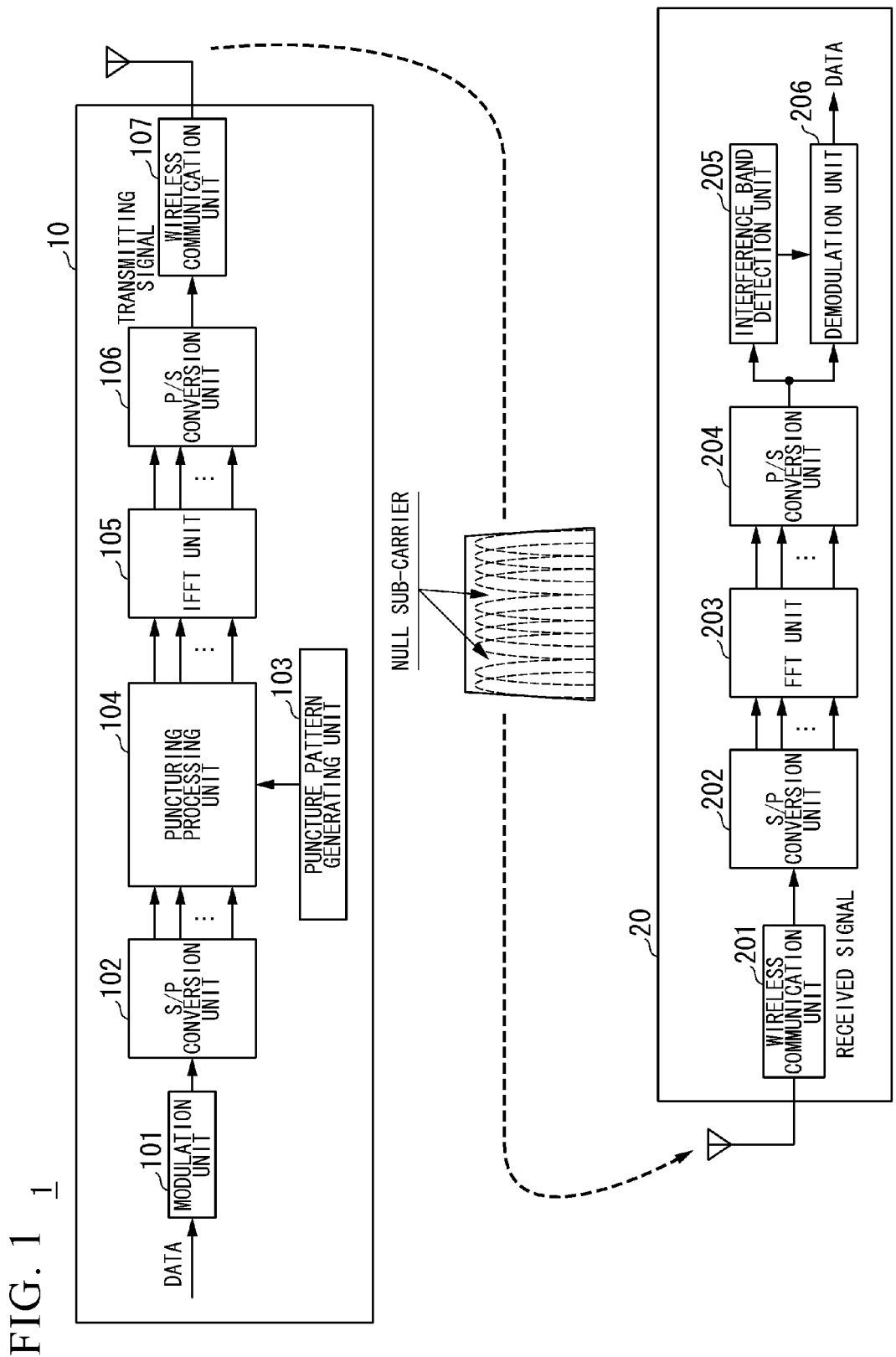

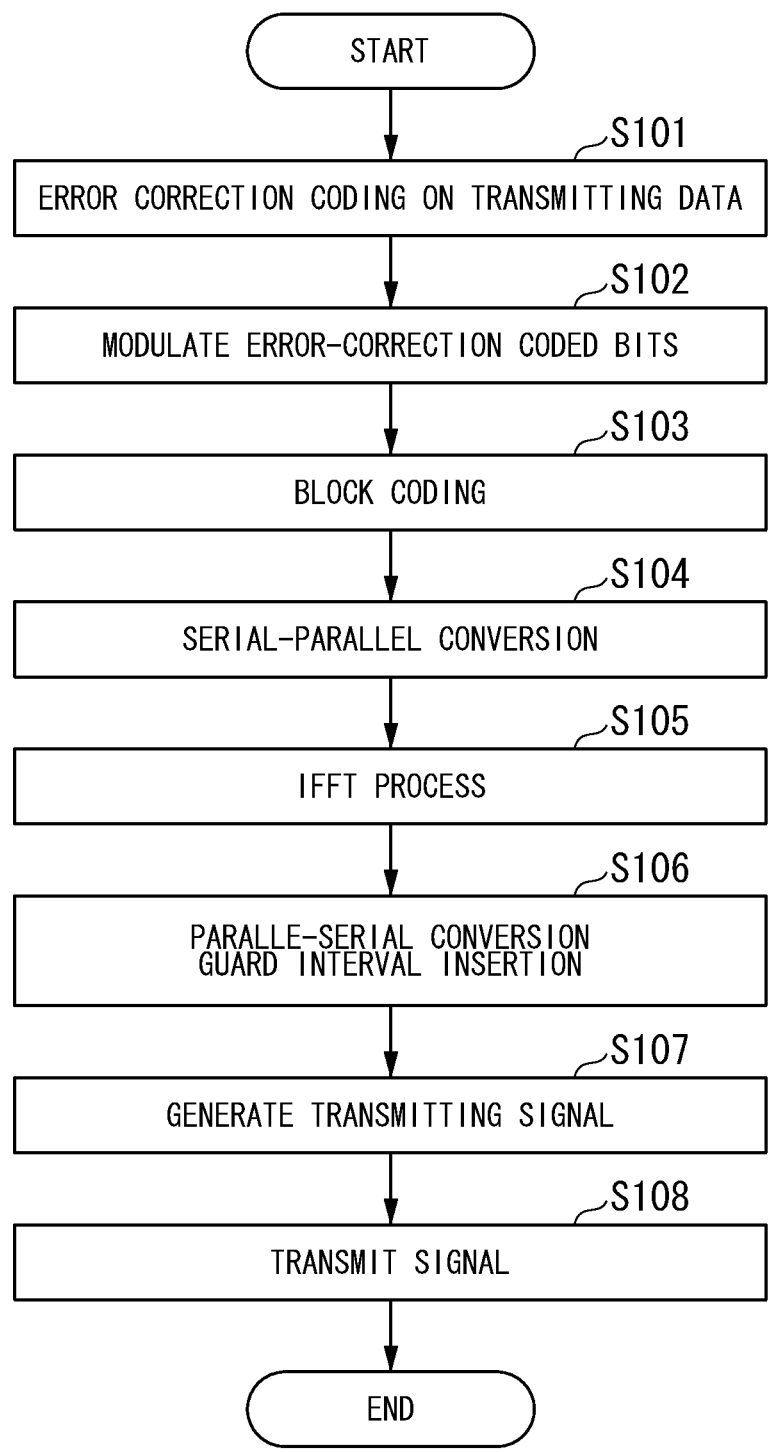

WIRELESS COMMUNICATION SYSTEM AND WIRELESS COMMUNICATION METHOD

TECHNICAL FIELD

This invention relates to wireless communication systems and wireless communication methods.

This application claims priority on Japanese Patent Application No. 2008-324412 filed on Dec. 19, 2008 and Japanese Patent Application No. 2009-49785 filed on Mar. 3, 2009, the entire contents of which are incorporated herein by reference.

BACKGROUND ART

Recently, starvation of limited frequency resources has been a serious problem in the field of wireless communication; hence, it is expected to improve frequency availability. Frequency sharing wireless communication may serve as a technology for improving frequency availability. FIG. 18 is a conceptual illustration showing the overall system constitution including two wireless LANs (Local Area Network) using different frequency channels, which is one example of a combination of wireless communication systems sharing frequency bands.

The illustrated wireless communication system includes wireless LAN base stations 10a, 10b and a receiver device 20a. The wireless LAN base station 10a performs communication using a frequency band of a channel CH1 with a center frequency fa. The wireless LAN base station performs communication using the frequency band of a channel CH5 with a center frequency fb (fa<fb).

The receiver device 20a is located at a position reachable by both of the wireless signals of the wireless LAN base stations 10a, 10b, so that the receiver device 20a may receive signals in which wireless signals having the center frequency fa partially interfere with wireless signals having the center frequency fb.

As another example of the technology sharing frequency bands, it is possible to present a wireless LAN system combined with a Bluetooth system (registered trademark) and a WiMAX system (registered trademark); hence, it may be possible to combine different communication systems which share frequencies.

During communication with the wireless LAN base station 10a, for example, a transmitting frequency band of a preferred signal having the center frequency fa partially overlaps (interferes) with a transmitting frequency band of an interference signal having the center frequency fb output from the wireless LAN base station 10b. In this frequency shared wireless communication, the receiver device 20a needs to improve frequency availability by efficiently performing error correction; hence, it is necessary to precisely detect the occurrence of an interference signal overlapped with the frequency band of a preferred signal.

As a technology for detecting the occurrence of an interference signal, a technology for measuring an interference signal by use of a pattern-known signal such as a training signal and a sounding signal has been developed (see Patent Document 1). Another technology for measuring an interference signal by use of a non-transmission interval of burst transmission or a null signal interval deliberately interposed in a data interval has been developed as well.

PRIOR ART DOCUMENT

Patent Document

Patent Document 1: Japanese Patent Application Publication No. 2007-282120

SUMMARY OF THE INVENTION

Problem Solved by the Invention

However, the foregoing technologies for detecting interference signals may degrade data transmitting efficiency or suffer from a problem due to low tracking with varying transmission lines.

Considering these circumstances, this invention is intended for the purpose of providing a wireless communication system and a wireless communication method which are able to detect interference signals while preventing degradation of data transmitting efficiency.

Means for Solving the Problem

[1] A first aspect of this invention demonstrates a wireless communication system including a transmitter device and a receiver device used for transmission of wireless signals including a plurality of sub-carriers, wherein the transmitter device performs error correction coding on transmitting data and selects at least one of the plurality of sub-carriers, used for transmission of error-correction coded data, as a null sub-carrier having zero amplitude, thus transmitting the error-correction coded data, whilst the receiver device receives signals having said plurality of sub-carriers from the transmitter device and performs error-correction decoding on received signals so as to reproduce original data subjected to transmission, wherein upon detecting reception power exceeding a predetermined threshold in a certain sub-carrier serving as the null sub-carrier, the receiver device determines whether an interference wave occurs in the sub-carrier.

[2] Another aspect of this invention demonstrates the wireless communication system, in which each sub-carrier serving as a null sub-carrier is changed in each time slot delimited by a predetermined time interval.

[3] A further aspect of this invention demonstrates the wireless communication system, wherein it is determined which sub-carrier among the plurality of sub-carriers is selected as the null sub-carrier in advance.

[4] A further aspect of this invention demonstrates the wireless communication system, in which null sub-carriers are allocated in an order counting from a sub-carrier having a highest frequency to a sub-carrier having a center frequency among the plurality of sub-carriers; alternatively, null sub-carriers are allocated in an order counting from a sub-carrier having a lowest frequency to the sub-carrier having the center frequency among the plurality of sub-carriers.

[5] A further aspect of this invention demonstrates the wireless communication system, in which one of the plurality of sub-carriers is randomly selected as a null sub-carrier.

[6] A further aspect of this invention demonstrates the wireless communication system, in which the number of null sub-carriers selected from among the plurality of sub-carriers is determined based on a coding ratio of forward error coding or characteristics of a transmission path established between the transmitter device and the receiver device.

[7] A further aspect of this invention demonstrates the wireless communication system, wherein the receiver device transmits interference wave detection information, representing the sub-carrier in which an interference wave is detected, to the transmitter device, whilst the transmitter device sets the null sub-carrier based on the interference wave detection information transmitted thereto.

[8] A further aspect of this invention demonstrates the wireless communication system, wherein the receiver device makes an estimate, based on the interference wave detection information during consecutive time slots, as to which sub-carrier among the plurality of sub-carriers undergoes an interference wave in any one of the consecutive time slots, so that the receiver device demodulates transmitted data without using a modulation symbol assigned to the sub-carrier undergoing the interference wave.

[9] A further aspect of this invention demonstrates the wireless communication system, wherein the transmitter device includes a modulation unit, adopting forward error correction coding on transmitting data, which modulates forward error-correction coded transmitting data so as to output modulation signals, and a puncturing processing unit which applies zero transmission power to a modulation signal, which is assigned to the sub-carrier serving as the null sub-carrier among the plurality of sub-carriers, among the modulation signals output from the modulation unit.

[10] A further aspect of this invention demonstrates the wireless communication system, in which the receiver device discards a received signal, corresponding to the sub-carrier serving as the null sub-carrier, as an invalid signal, thus performing demodulation and error correction decoding without using the received signal.

[11] A further aspect of this invention demonstrates the wireless communication system, wherein the transmitter device includes an error correction coding unit that performs error correction coding on transmitting data so as to generate error-correction coded bits; a first modulation unit that modulates error-correction coded bits so as to generate a plurality of modulation symbols; a block coding unit that performs block coding on the plurality of modulation symbols, a part of which becomes zero in amplitude; a second modulation unit that allocates block-coded modulation symbols to sub-carriers so as to generate modulation signals; and a transmission unit that generates and outputs transmitting signals based on modulation signals, whilst the receiver device includes a reception unit that receives signals transmitted thereto; a second demodulation unit that retrieves modulation symbols, which are subjected to block coding in units of sub-carries, from received signals; a block decoding unit that performs block decoding, which is commensurate to block coding of the block coding unit, on block-coded modulation symbols; a first demodulation unit that performs demodulation, which is commensurate to modulation of the first modulation unit, on block-decoded modulation symbols; an error correction decoding unit that performs error correction and decoding, which is commensurate to the error correction coding of the error correction coding unit, by use of demodulated values, thus reproducing original data subjected to transmission; a decision unit that identifies a frequency band of the sub-carrier having zero amplitude in transmitting signals generated by the transmission unit based on transmitted data; and a detection unit that detects an interference signal representative of a signal having the frequency band of the sub-carrier having zero amplitude, identified by the decision unit, among received signals transmitted thereto.

[12] A further aspect of this invention demonstrates the wireless communication system, wherein the decision unit performs error correction coding which is identical to the error correction coding of the error correction coding unit, performs modulation which is identical to the modulation of the first modulation unit, and performs the block coding which is identical to the block coding of the block coding unit on transmitted data, thus identifying the frequency band of the sub-carrier having zero amplitude among transmitting signals generated by the transmission unit.

[13] A further aspect of this invention demonstrates the wireless communication system, wherein the receiver device further includes an interference band information signal transmission unit that generates interference band information representative of the sub-carrier undergoing an interference wave based on the detected interference signal so as to transmit the interference band information to the transmitter device, and wherein the first modulation unit or the error correction coding unit of the transmitter device determines a modulation method or a coding ratio based on the interference band information.

[14] A further aspect of this invention demonstrates a wireless communication method which is adapted to a wireless communication system including a transmitter device and a receiver device used for transmission of wireless signals including a plurality of sub-carriers and which is characterized by implementing a procedure in which the transmitter device performs error correction coding on transmitting data and sets a null sub-carrier having zero amplitude representative of at least one of the plurality of sub-carriers used for transmission of error-correction coded data, thus transmitting the error-correction coded data, and a procedure in which the receiver device receives signals having the plurality of sub-carriers from the transmitter device so as to retrieve original transmitted data by implementing error correction decoding on received signals, thus determining whether an interference wave occurs in the sub-carrier upon detecting reception power exceeding a predetermined threshold in the sub-carrier serving as the null sub-carrier.

Effect of the Invention

In this invention, after implementation of error correction coding on transmitting data, a transmitter device transmits a null sub-carrier having zero amplitude representing a part of a sub-carrier for transmitting data with error correcting codes. A receiver device detects an interference signal, representing a signal having a null sub-carrier frequency band, from received signals while performing error correction decoding so as to decode transmitted data. Since this invention is able to generate a null sub-carrier without the addition of more data, exclusively used for generating a null sub-carrier, to transmitting data, it is possible to detect an interference signal without degrading the data transmitting efficiency.

BRIEF DESCRIPTION OF THE DRAWINGS

FIG. 1 A block diagram showing the overview constitution of a wireless communication system according to a first embodiment including a transmitter device and a receiver device.

FIG. 13 A flowchart illustrating a transmitting procedure of the transmitter device according to the third embodiment.

MODE FOR CARRYING OUT THE INVENTION

Hereinafter, wireless communication systems according to various embodiments of this invention will be described with reference to the drawings.

First Embodiment

FIG. 1 is a block diagram showing the constitution of a wireless communication system 1 including a transmitter device 10 and a receiver device 20. The wireless communication system 1 is constituted of the transmitter device 10 for transmitting data and the receiver device 20 for receiving data from the transmitter device 10.

The wireless communication system 1 of this embodiment adopts an OFDM (Orthogonal Frequency Division Multiplexing) method achieving multicarrier communication; hence, the following description refers to an application of a superposed multicarrier transmission method.

Figure 2A:
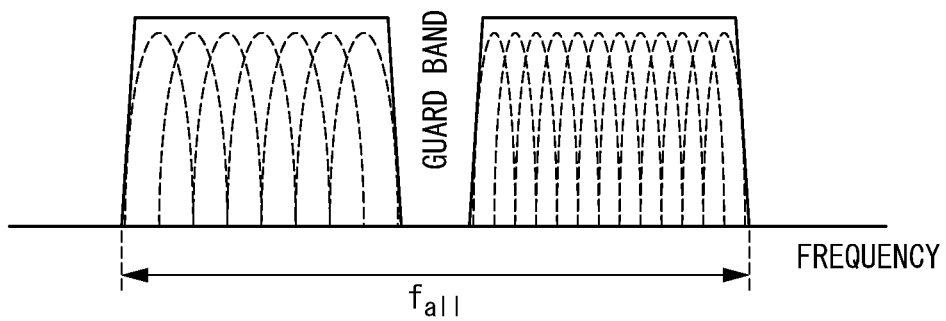
FIG. 2A A conceptual illustration representative of superposed multicarrier transmission.
Figure 2B:
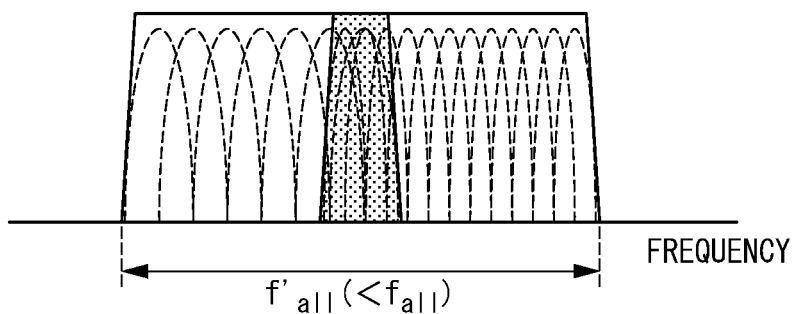
FIG. 2B A conceptual illustration representative of superposed multicarrier transmission.

The superposed multicarrier transmission method is a name of one technology for improving frequency availability. FIGS. 2A and 2B are illustrations for explaining the superposed multicarrier transmission method. Generally speaking, as shown in FIG. 2A, wireless communication system performing communication using a plurality of nearby frequency bands introduces a guard band between available frequency bands so as to prevent mutual interference therebetween.

However, this guard band is unnecessarily used for communication and therefore related to one cause of preventing improvement of frequency availability.

This drawback can be solved by not using guard bands as shown in FIG. 2B in which frequency bands are partially superposed on each other during communication implemented on the precondition that various signals mutually interfere with each other, wherein upon detecting the occurrence of mutual interference, error correction decoding is performed using signals not susceptible to mutual interference, thus reducing frequency bands occupied by the wireless communication system and thereby improving frequency availability.

Referring back to FIG. 1, the transmitter device 10 and the receiver device 20 will be described.

The transmitter device 10 includes a modulation unit 101, an S/P (serial/parallel) conversion unit 102, a puncture pattern generating unit 103, a puncturing processing unit 104, an IFFT (Inverse Fast Fourier Transform) unit 105, a P/S (parallel/serial) conversion unit 106, and a wireless communication unit 107.

The modulation unit 101 inputs transmitting bit data, wherein Forward Error Correction (FEC) codes are applied to input bit data so that a modulation symbol, representing the result of modulating bit data subjected to forward error correction coding, is output to the S/P conversion unit 102. For instance, the modulation unit 101 may employ convolutional codes, turbo codes or low-density parity check codes (LDPC) in terms of forward error correction codes, while the modulation unit 101 may adopt QPSK (Quadrature Phase Shift Keying), 16QAM (16-position Quadrature Amplitude Modulation) or 64QAM (64-position Quadrature Amplitude Modulation) in terms of modulation.

The S/P conversion unit 102 performs serial-parallel conversion on the modulation symbol output from the modulation unit 101, thus outputting the converted symbol to the puncturing processing unit 104. The puncture pattern generating unit 103 generates null pattern information representing a sub-carrier allocating Null, designating zero transmitting power, to one of sub-carriers used for communication, so that the generated null pattern information is output to the puncturing processing unit 104. The puncturing processing unit 104 changes the modulation symbol, which is designated by the null pattern information output from the puncture pattern generating unit 103 among serial-parallel converted modulation symbols output from the S/P conversion unit 102, with Null designating zero power, which is subsequently forwarded to the IFFT unit 105.

The IFFT unit 105 converts the modulation symbol output from the puncturing processing unit 104 into a time-domain signal by way of an inverse FFT process, so that the converted signal is forwarded to the P/S conversion unit 106.

The P/S conversion unit 106 performs parallel-serial conversion on the output signal of the IFFT unit 105, thus outputting the converted signal to the wireless communication unit 107. The wireless communication unit 107, coupled with an antenna, performs up-converts a parallel-serial converted signal, output from the P/S conversion unit 106, into a frequency band of a carrier wave, which is subsequently transmitted to the receiver device 20.

The receiver unit 20 includes a wireless communication unit 201, an S/P conversion unit 202, an FFT (Fast Fourier Transform) unit 203, a P/S conversion unit 204, an interference band detection unit 205, and a demodulation unit 206. The wireless communication unit 201 coupled with an antenna receives signals, transmitted by the transmitter device 10, so as to down-convert received signals to ones not having the frequency band of a carrier wave, thus outputting converted signals to the S/P conversion unit 202.

The S/P conversion unit 202 performs serial-parallel conversion on modulation symbols received by the wireless communication unit 201, thus outputting converted symbols to the FFT unit 203. The FFT unit 203 converts serial-parallel converted modulation symbols, output from the S/P conversion unit 202, into frequency-domain modulation symbols by way of an FFT process, thus outputting them to the P/S conversion unit 204.

The P/S conversions unit 204 performs parallel-serial conversion on converted modulation symbols, output from the FFT unit 203, so as to output them to the interference band detection unit 205 and the modulation unit 206. The interference band detection unit 205 stores null pattern information representative of a sub-carrier which is assigned as a null sub-carrier, wherein the interference band detection unit 205 detects the occurrence of an interference wave in the sub-carrier upon detecting a signal power exceeding predetermined reception power from the modulation symbol corresponding to the sub-carrier assigned as the null sub-carrier, thus outputting interference band information representing the sub-carrier, which is deemed susceptible to the interference wave, to the demodulation unit 206. The interference band detection unit 205 detects the reception power of the detected interference wave. For instance, the interference band detection unit 205 is able to detect an interference wave upon detecting reception power of a null sub-carrier in response to null pattern information which is selected by a control signal or the like.

The demodulation unit 206 outputs bit data, which is obtained by way of error correction decoding and demodulation, without using a modulation symbol corresponding to a sub-carrier, which is deemed susceptible to an interference wave based on interference band information output from the interference band detection unit 205, among modulation symbols output from the P/S conversion unit 204. In addition, the demodulation unit 206 treats a received signal, which is received from a sub-carrier assigned as a null sub-carrier, as an invalid signal, so that error correction decoding and demodulation are performed without using such received signal.

Next, the setting of a null sub-carrier and the detection of an interference wave will be described.

Figure 3:
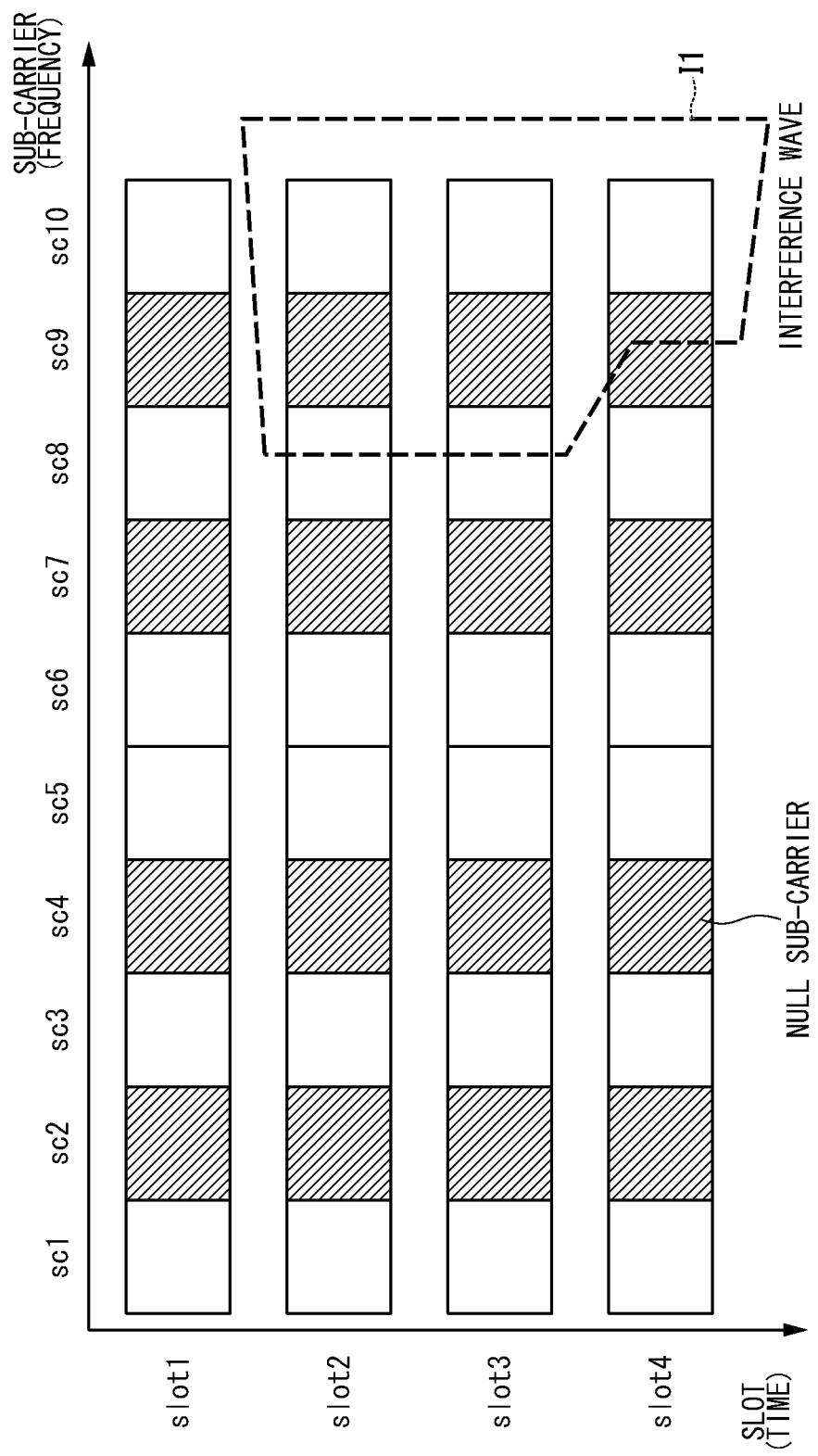
FIG. 3 A conceptual illustration representative of transmitting frames demonstrating an example of an allocation of null sub-carriers according to the first embodiment.

FIG. 3 is a conceptual illustration representative of transmitting frames demonstrating an example of an allocation of null sub-carriers. Herein, the horizontal axis represents sub-carrier (frequency) whilst the vertical axis represents time slot (time). Each transmitting frame includes ten sub-carriers allocated to different frequencies and further includes four time slots each delimited in a predetermined time interval. In this illustration, the puncture pattern generating unit 103 sets null sub-carriers to predetermined sub-carriers (sub-carriers 2, 4, 7, 9) in each transmitting frame.

When an interference wave occurs in sub-carriers encompassed by a dotted line I1, the interference band detection unit 205 detects sub-carriers susceptible to the interference wave in accordance with the following procedure.

In time slot 1, the interference band detection unit 205 determines that no interference band occurs in this time slot because high power exceeding a predetermined threshold is not detected from modulation symbols corresponding to null sub-carriers allocated therein. Herein, the predetermined threshold is statistically or empirically determined upon detecting how much reception power causes an interference wave, wherein this value indicates a power value assuming white noise.

In time slots 2-4, the interference band detection unit 205 detects a modulation symbol, whose reception power exceeds the predetermined threshold due to the occurrence of an interference wave, in null sub-carrier 9. Thus, the interference band detection unit 205 estimates the occurrence of an interference wave in sub-carrier 10 because such an interference wave likely occurs in both sides of a communication band owing to an application of a superposed multicarrier transmission method. Since reception power exceeding the threshold is not detected in sub-carrier 7, the interference band detection unit 205 determines that the boundary of an interference band may be disposed in sub-carrier 8 or sub-carrier 9, so that the interference band detection unit 205 treats sub-carriers 8-10 as sub-carriers susceptible to the interference wave, thus outputting interference band information to the demodulation unit 206.

Despite of the description in which sub-carrier 8 is treated as an interference band susceptible to an interference wave, the interference band detection unit 205 may collectively treat sub-carriers 9-10 as an interference band. In this illustration in which the interference band detection unit 205 detects an interference wave in sub-carrier 9 but does not detect such an interference wave in sub-carrier 7, it is estimated that the boundary of an interference band may be disposed in sub-carrier 8 or sub-carrier 9. This is because, even though the interference band detection unit 205 makes an erroneous determination departing from the actual situation, it is highly likely to precisely detect bit data by way of error correction decoding.

Despite of the description in which the interference band detection unit 205 detects an interference band in units of time slots, it is possible to detect an interference band in units of transmitting frames.

Figure 4:
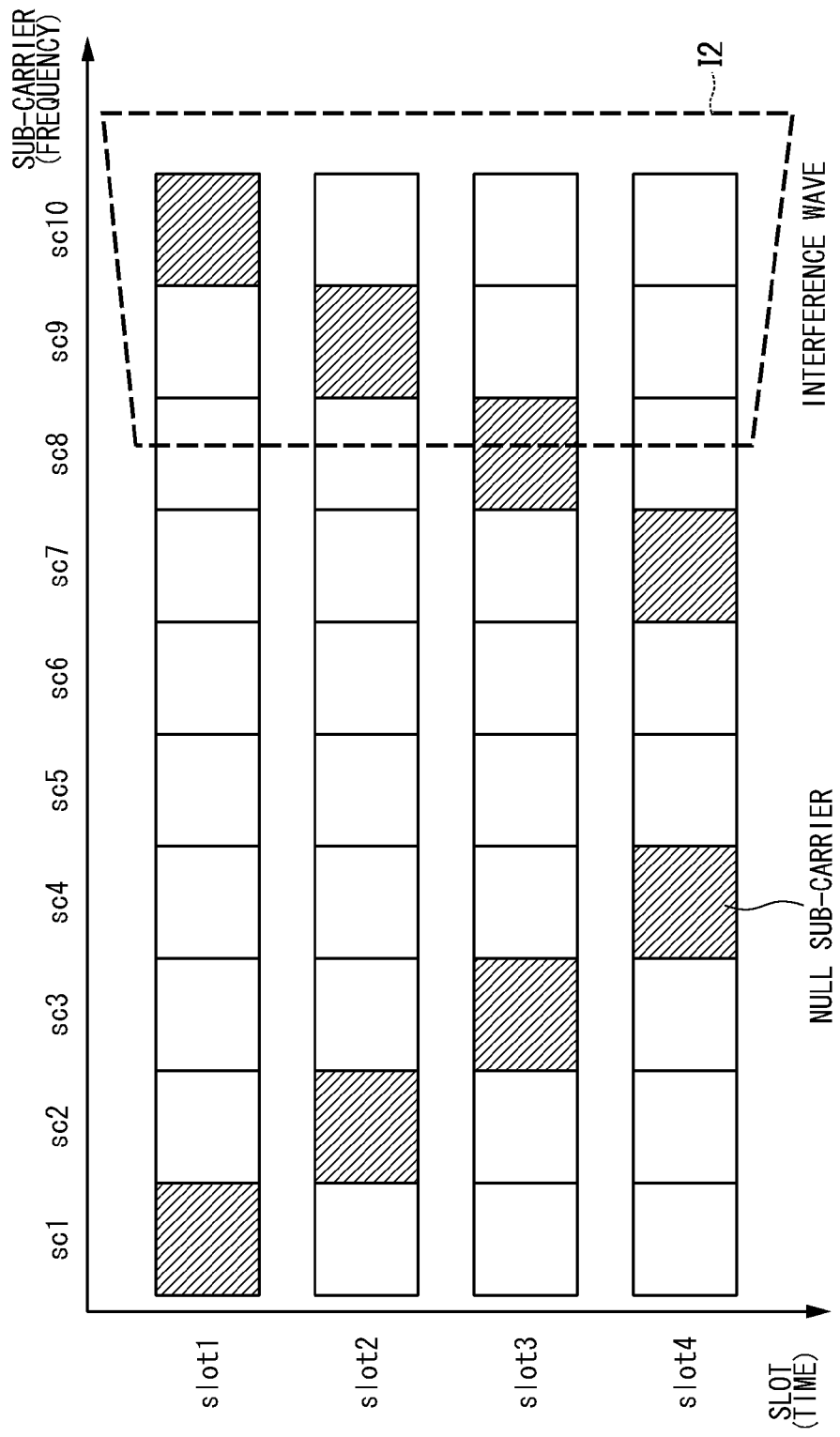
FIG. 4 A conceptual illustration representative of transmitting frames demonstrating another example of an allocation of null sub-carriers according to the first embodiment.

Next, FIG. 4 is a conceptual illustration representative of transmitting frames demonstrating another example of an allocation of null sub-carriers. Similar to FIG. 3, the horizontal axis represents sub-carrier while the vertical axis represents time slot. FIG. 4 shows that an interference wave occurs in sub-carriers encompassed by a dotted line I2.

Each transmitting frame includes ten sub-carriers and four time slots. In this illustration, the puncture pattern generating unit 103 sets null sub-carriers to predetermined sub-carriers, which are changed in units of time slots. In this illustration, the puncture pattern generating unit 103 sets null sub-carriers to sub-carriers 1, 10 in time slot 1; it sets null sub-carriers to sub-carriers 2, 9 in time slot 2; it sets null sub-carriers to sub-carriers 3, 8 in time slot 3; it sets null sub-carriers to sub-carriers 4, 7 in time slot 4.

In this illustration, the puncture pattern generating unit 103 sequentially arranges null sub-carriers at predetermined positions, which are changed in units of time slots, in a direction from the side ends of a communication frequency band to the center of the communication frequency band. Upon detecting the boundary of an interference band in units of transmitting frames, the interference band detection unit 205 determines that the boundary of an interference wave may be disposed in sub-carrier 8 in each transmitting frame when the interference band is not greatly varied among transmitting frames, so that the interference band detection unit 205 outputs interference band information, representing that the interference band matches sub-carriers 8-10 in time slots 1-4, to the demodulation unit 206.

In this illustration, the puncture pattern generating unit 103 sequentially allocates null sub-carriers to time slots in the direction from the side ends to the center of the communication frequency band, thus allowing the interference band detection unit 205 to easily determine which sub-carrier of each transmitting frame is susceptible to an interference wave. In particular, in the wireless communication system adopting the superposed multicarrier transmission method, it is possible to improve a tracking ability in detecting a frequency band causing an interference wave.

Figure 5:
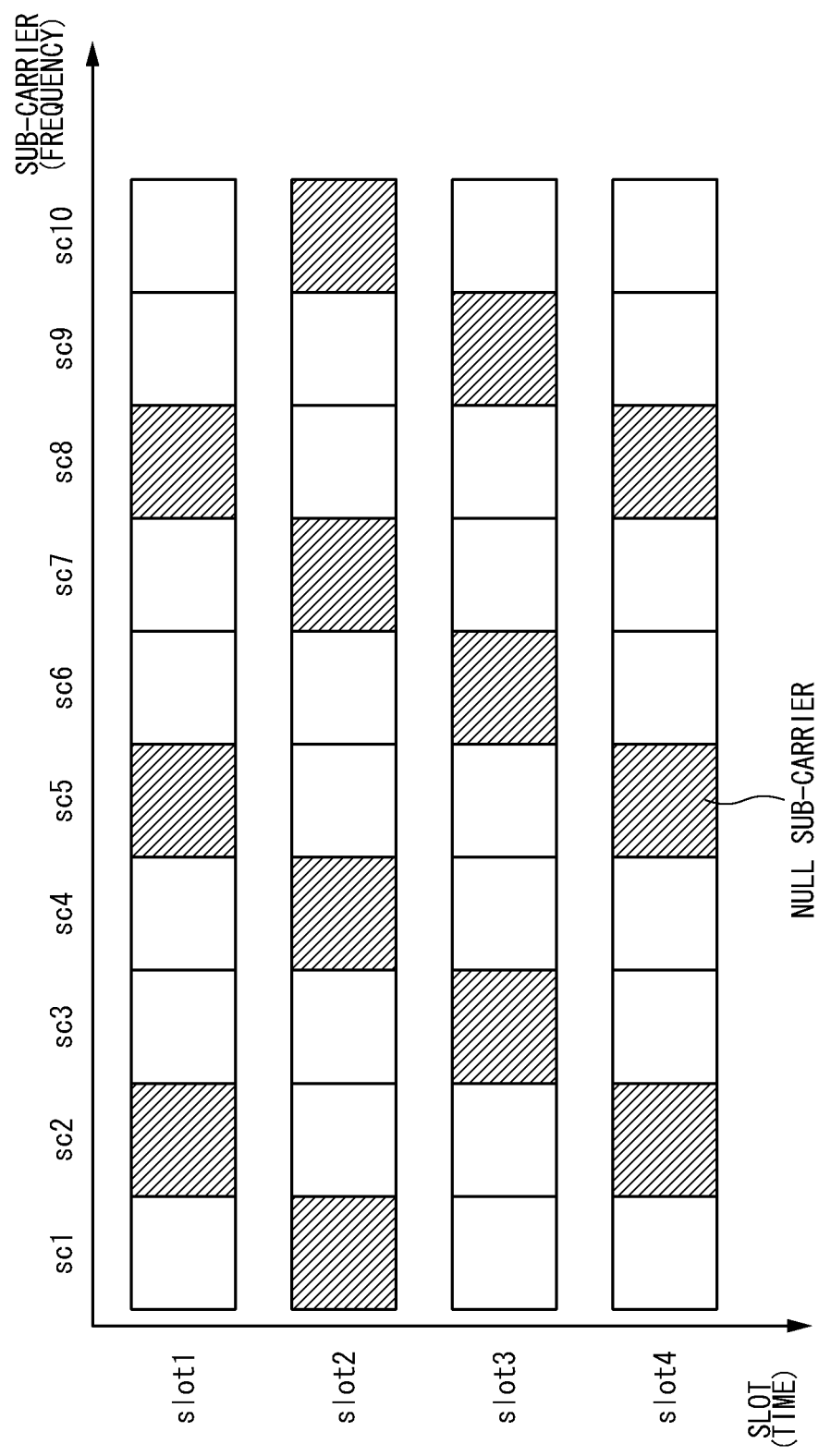
FIG. 5 A conceptual illustration representative of transmitting frames demonstrating a further example of an allocation of null sub-carriers according to the first embodiment.

FIG. 5 is a conceptual illustration representative of transmitting frames demonstrating a further example of an allocation of null sub-carriers. Similar to FIG. 3, the horizontal axis represents sub-carrier while the vertical axis represents time slot. Each transmitting frame includes ten sub-carriers and four time slots. In this illustration, the puncture pattern generating unit 103 selects and changes sub-carriers, serving as null sub-carriers, in units of time slots. In this illustration, the puncture pattern generating unit 103 selects sub-carriers 4, 5, 8 in time slot 1; selects sub-carriers 1, 4, 7, 10 in time slot 2; selects sub-carriers 3, 7, 9 in time slot 3; and selects sub-carriers 2, 5, 8 in time slot 4.

Since the puncture pattern generating unit 103 allocates null sub-carriers in a wedge-like formation, it is possible to detect an interference wave over all the sub-carriers in each transmitting frame, wherein it is possible to detect an interference wave occurring in any one of sub-carriers in the communication frequency band.

As described above, the interference band detection unit 205 identifies an interference band, corresponding to a sub-carrier susceptible to the interference wave, based on reception power of a modulation symbol corresponding to a null sub-carrier, thus outputting interference band information, representing the determination result, to the demodulation unit 206. Thus, the demodulation unit 206 performs error correction decoding and demodulation without using a modulation symbol susceptible to an interference wave or a modulation symbol likely susceptible to an interference wave; hence, it is possible to improve an error correcting ability.

Since an interference wave and an interference band are detected in units of time slots in each transmitting frame, it is possible to detect an interference wave with a good tracking ability in detecting the occurrence of an interference wave.

The present embodiment illustrates three examples for allocating null sub-carriers; however, it is possible to allocate null sub-carriers in other patterns other than the foregoing allocations, or it is possible to allocate them at random.

The number of null sub-carriers set to each time slot is determined based on a coding ratio of forward error correction coding. Even though some modulation symbols are untransmitted due to the setting of null sub-carriers, it is possible to set a preferred number of null sub-carriers which still allows the receiver device 20 to accurately perform error correction decoding. In this case, it is preferable that the number of null sub-carriers be determined based on characteristics of propagation paths established between the transmitter device 10 and the receiver device 20.

Second Embodiment

Figure 6:
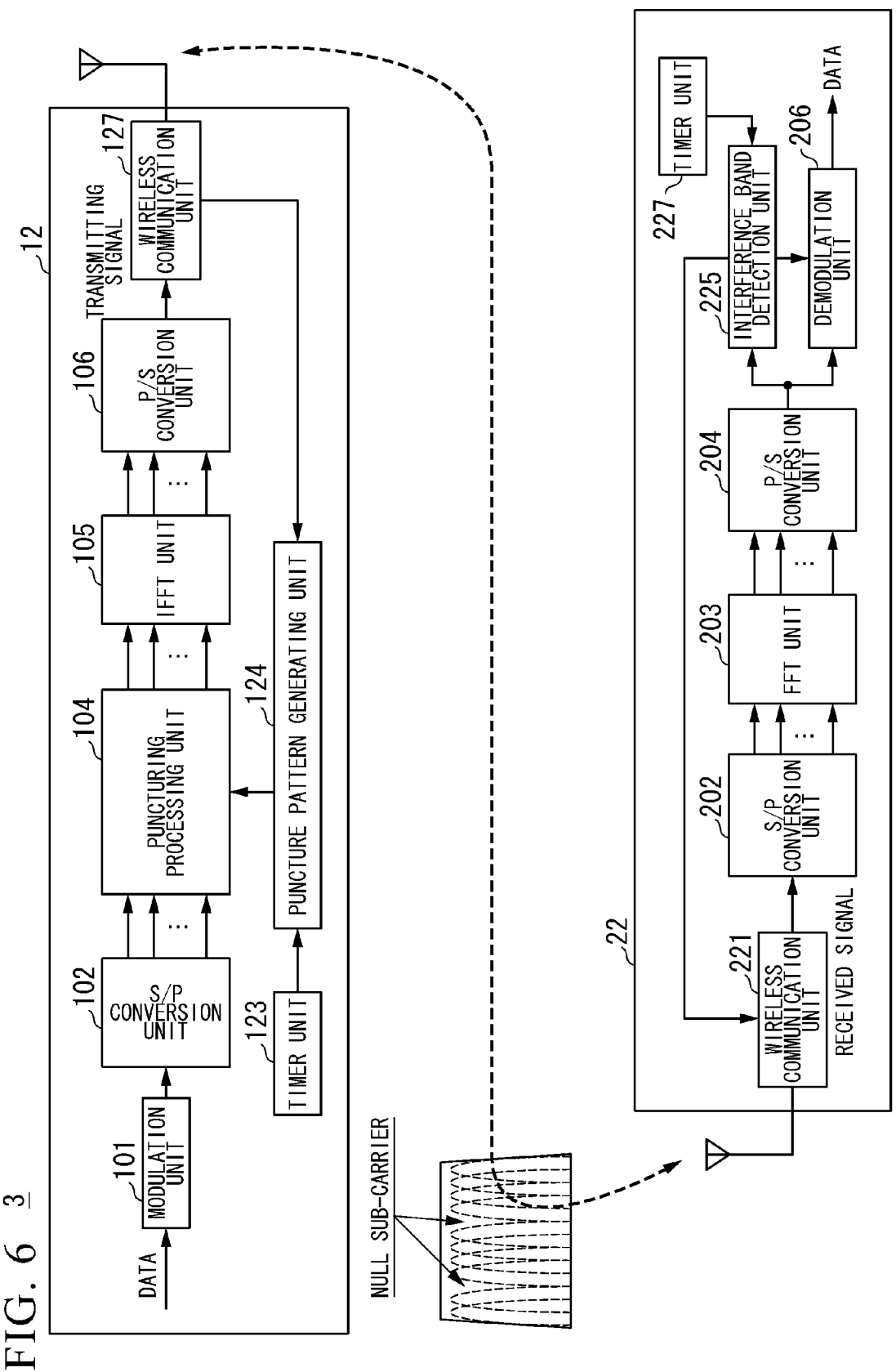
FIG. 6 A block diagram showing the overview constitution of a wireless communication system including a transmitter device and a receiver device according to a second embodiment.

FIG. 6 is a block diagram showing the overall constitution of a wireless communication system 3 including a transmitter device 12 and a receiver device 22 according to a second embodiment. The wireless communication system 3 is constituted of the transmitter device 12 for transmitting data and the receiver device 22 for receiving data from the transmitter device 12. Similar to the wireless communication system 1 of the first embodiment, the wireless communication system 3 adopts an OFDM method demonstrating multicarrier communication; hence, the following description is made with reference to a superposed multicarrier transmission method.

The transmitter device 12 includes the modulation unit 101, the S/P conversion unit 102, the puncturing processing unit 104, the IFFT unit 105, the P/S conversion unit 106, a wireless communication unit 127, a timer unit 123, and a puncture pattern generating unit 124. The transmitter device 12 differs from the transmitter device 10 of the first embodiment in terms of the puncture pattern generating unit 124, the timer unit 123, and the wireless communication unit 127 while other constituent elements are not changed; hence, the foregoing reference numerals (101, 102, 104-106) are used to denote the corresponding parts, and a description thereof will be omitted.

The timer unit 123 is reset in response to the start timing of transmission of bit data; thereafter, the timer unit 123 counts a predetermined time interval, such as a time interval of one transmitting frame, a time interval of several frames and a real time suited to communication characteristics, wherein upon completion of counting each time interval, the time unit 123 outputs information, representing a lapse of a predetermined time interval, to the puncture pattern generating unit 124, subsequently, the timer unit 123 is reset and starts counting again.

Similar to the puncture pattern generating unit 103 of the first embodiment, the puncture pattern generating unit 124 generates null pattern information, representing which sub-carrier among sub-carriers used for communication is assigned with Null designating zero transmission power, so as to output the null pattern information to the puncturing processing unit 104, wherein the puncture pattern generating unit 124 further generates null pattern information for setting a null sub-carrier in response to a feedback of interference wave detection information from the reception device 22, thus outputting the null pattern information to the puncturing processing unit 104.

Similar to the wireless communication unit 107 of the first embodiment, the wireless communication unit 127 coupled with an antenna up-converts parallel-serial converted signals, output from the P/S conversion unit 106, into ones having a frequency band of a carrier wave, which are subsequently transmitted to the receiver device 22, wherein the wireless communication unit 127 receives interference wave detection information, representing that reception power exceeding the predetermined threshold set to each null sub-carrier is detected, from the receiver device 22, thus forwarding the received interference wave detection information to the puncture pattern generating unit 124.

The receiver device 22 includes a wireless communication unit 221, the S/P conversion unit 202, the FFT unit 203, the P/S conversion unit 204, an interference band detection unit 225, a timer unit 227, and the demodulation unit 206. The receiver device 22 differs from the receiver device 20 of the first embodiment in terms of the wireless communication unit 221 and the interference band detection unit 225, but other constituent elements are not changed; hence, the foregoing reference numerals (202-204, 206) are used to designate the corresponding parts, and a description thereof will be omitted.

The timer unit 227 operates in synchronization with the timer unit 123 of the transmitter device 12 so that the timer unit 227 is reset in response to the start timing of transmission of bit data; thereafter, the timer unit 227 counts a predetermined time interval, such as a time interval of one transmitting frame, a time interval of several frames, and a real time suited to characteristics of communication, wherein upon completing of counting each time interval, the timer unit 227 outputs timing information, representing a lapse of a predetermined time interval, to the interference band detection unit 225, subsequently, the timer unit 227 is reset and starts counting again. For instance, synchronization between the timer unit 227 and the timer unit 123 can be established using a control signal for starting transmission of bit data.

Similarly to the interference band detection unit 205, the interference band detection unit 225 stores null pattern information, and upon detecting a signal power exceeding the predetermined reception power from a modulation symbol corresponding to a sub-carrier assigned as a null sub-carrier, the interference band detection unit 225 detects the occurrence of an interference wave in the sub-carrier, so that the interference band detection unit 225 outputs interference band information, representing the sub-carrier which is deemed susceptible to an interference wave, to the demodulation unit 206 while detecting reception power of the detected interference wave.

In addition, the interference band detection unit 225 initializes switchover of null pattern information based on timing information output from the timer unit 227.

Similarly to the wireless communication unit 201 of the first embodiment, the wireless communication unit 221 coupled with an antenna receives signals, transmitted by the transmitter unit 12, so as to down-convert received signals having a frequency band of a carrier wave, thus outputting modulation symbols to the S/P conversion unit 202. Furthermore, the wireless communication unit 221 transmits interference wave detection information, output from the interference wave detection unit 225, in terms of control channels and control signals.

Figure 7:
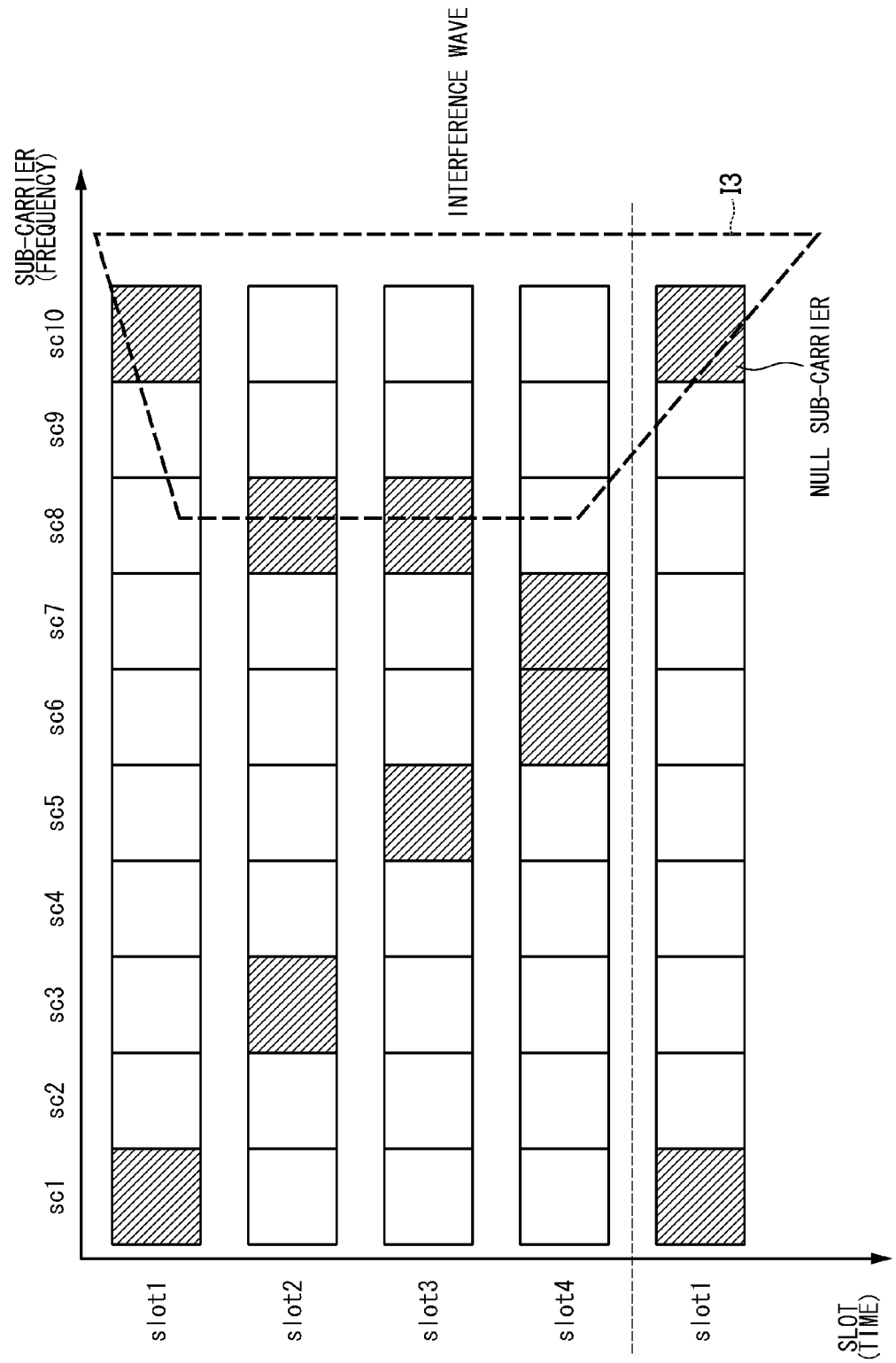
FIG. 7 A conceptual illustration representative of transmitting frames demonstrating an example of a allocation of null sub-carriers according to the second embodiment.

Next, the operation of the wireless communication system 3 will be described with reference to FIGS. 7 and 8. FIG. 7 is a conceptual illustration representative of transmitting frames demonstrating a further example of an allocation of null sub-carriers in this embodiment. As shown in FIG. 7, an interference band occurs in sub-carriers 8-10 encompassed by a dotted line I3 in time slots 1-4.

Figure 8:
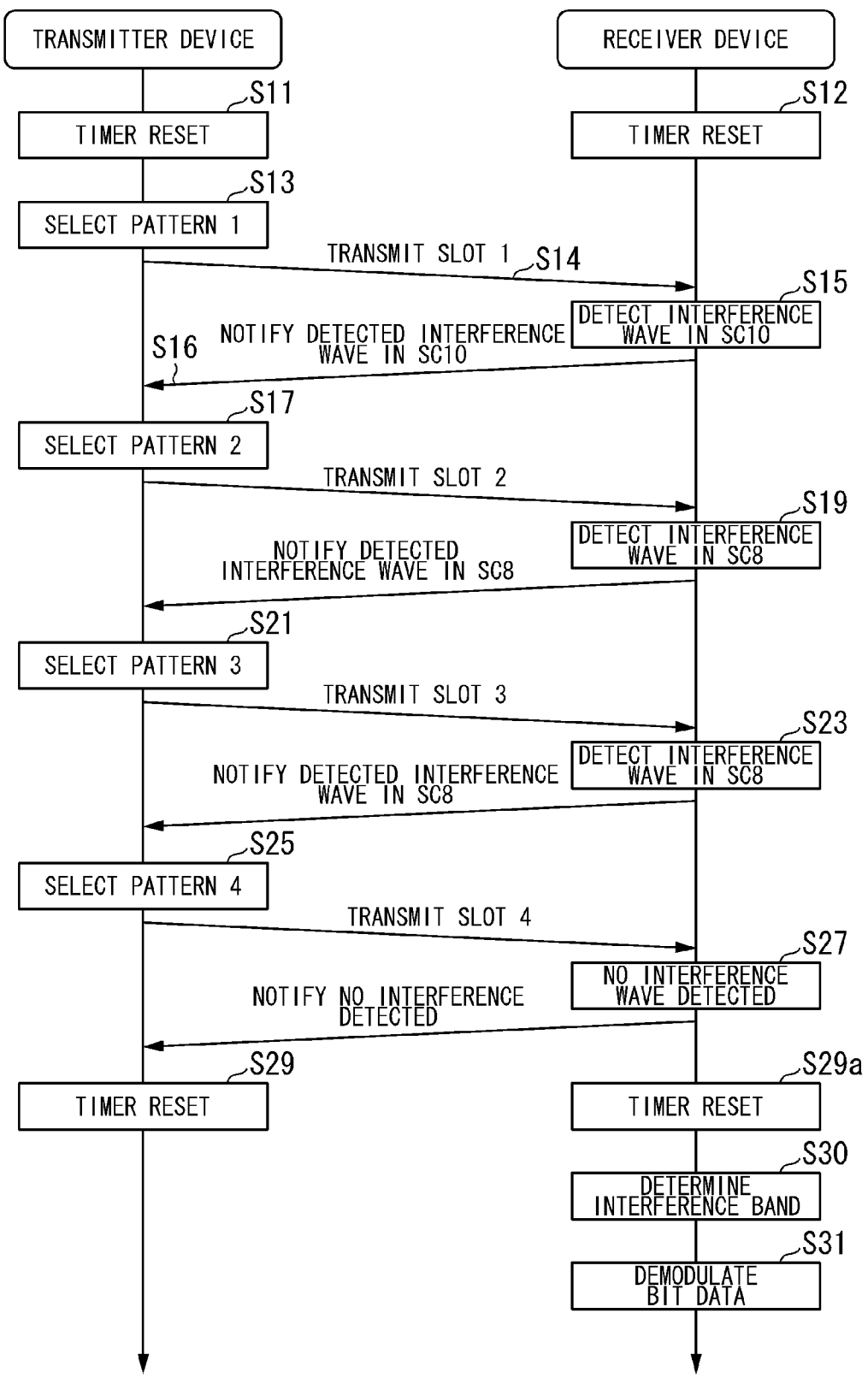
FIG. 8 A sequence diagram illustrating the operation of the transmitter device and the receiver device according to the second embodiment.

FIG. 8 is a sequence diagram showing the overall operation of the transmitter device 12 and the receiver device 22. In this embodiment, the timer units 123, 127 are reset upon completion of counting per one transmitting frame.

First, the timer unit 123 is reset in response to transmission of bit data (step S11), whilst the timer unit 227 is reset in synchronization with the timer unit 123 (step S12).

When transmission of bit data is started, the puncture pattern generating unit 124 outputs pattern 1, which designates sub-carriers 1, 10 as null sub-carriers, to the puncturing processing unit 104 (step S13).

The puncturing processing unit 104 sets null sub-carriers in conformity with the input pattern 1 from the puncture pattern generating unit 124, so that a modulation symbol assigned with a null sub-carrier is processed by the IFFT unit 105, the P/S conversion unit 106, and the wireless communication unit 127 in turn; subsequently, a signal of time slot 1 is transmitted to the receiver device 22 (step S14).

The receiver device 22 receives signals transmitted from the transmitter device 12 with the wireless communication device 221, so that received signals are processed by the S/P conversion unit 202, the FFT unit 203, and the P/S conversion unit 204 in turn; subsequently, processed signals are supplied to the interference band detection unit 225 and the demodulation unit 206.

The interference band detection unit 225 detects reception power, which exceeds the threshold, from a modulation symbol corresponding to sub-carrier 10 serving as a null sub-carrier (step S15), thus outputting interference wave detection information, representing the occurrence of an interference wave in sub-carrier 10, to the demodulation unit 206 and the wireless communication unit 221. The wireless communication unit 221 transmits the interference wave detection information, output from the interference band detection unit 225, to the transmitter device 12 (step S16).

In the transmitter device 12, the wireless communication unit 127 receives the interference wave detection information from the receiver unit 22, so that the received interference wave detection information to the puncture pattern generating unit 124. Upon receiving the interference wave detection information, representing the occurrence of an interference wave in sub-carrier 10, the puncture pattern generating unit 124 allocates a null sub-carrier close to the center frequency of the communication frequency band in order to detect the boundary of an interference band, thus forwarding pattern 2, in which null sub-carriers are set to sub-carriers 3, 8, to the puncturing processing unit 104 (step S17).

The puncturing processing unit 104 sets null sub-carriers in response to the pattern 2 output from the puncture pattern generating unit 124; the IFFT unit 105 performs an inverse FFT process on a modulation symbol, assigned with a null sub-carrier; the P/S conversion unit 106 performs parallel-serial conversion on the inverse-FFT processed modulation symbol; subsequently, the wireless communication unit 127 transmits the parallel-serial converted modulation symbol to the receiver device 22 (step S18).

In the receiver device 22, the wireless communication unit 221 receives signals transmitted from the transmitter device 12, so that receives signals are processed by the S/P conversion unit 202, the FFT unit 203, and the P/S conversion unit 204 in turn; subsequently, processed signals are supplied to the interference band detection unit 225 and the demodulation unit 206.

The interference band detection unit 225 detects reception power, which exceeds the threshold, from a modulation symbol corresponding to sub-carrier 8 serving as a null sub-carrier (step S19), thus outputting interference wave detection information, representing the occurrence of an interference wave in sub-carrier 10, to the demodulation unit 206 and the wireless communication unit 221. The wireless communication unit 221 transmits the interference wave detection information, output from the interference band detection unit 225, to the transmitter device 12 (step S20).

In the transmitter device 12, the wireless communication unit 127 receives the interference wave detection information from the receiver device 22, so that the received interference wave detection information is supplied to the puncture pattern generating unit 124. Upon receiving the interference wave detection information, representing the occurrence of an interference wave in sub-carrier 8, the puncture pattern generating unit 124 allocates a null sub-carrier close to the center frequency of the communication frequency band so as to narrow down the search scope of the boundary of an interference band, wherein the puncture pattern generating unit 124 outputs pattern 3, in which null sub-carriers are set to sub-carriers 5, 8 in order to detect the boundary of an interference band, to the puncturing processing unit 104 (step S21).

The puncturing processing unit 104 sets a null sub-carrier in response to the pattern 3 output from the puncture pattern generating unit 124; the IFFT unit 105 performs an inverse FFT process on a modulation symbol, assigned with a null sub-carrier; the P/S conversion unit 106 performs parallel-serial conversion on the inverse-FFT processed modulation symbol; subsequently, the wireless communication unit 127 transmits the parallel-serial converted modulation symbol to the receiver unit 22 (step S22).

In the receiver unit 22, the wireless communication unit 221 receives signals transmitted from the transmitter device 12, so that received signals are processed by the S/P conversion unit 202, the FFT unit 203, and the P/S conversion unit 204 in turn; subsequently, processed signals are supplied to the interference band detection unit 225 and the demodulation unit 206.

The interference band detection unit 225 detects reception power, which exceeds the threshold, from a modulation symbol corresponding to sub-carrier 8 serving as a null sub-carrier (step S23), thus outputting interference wave detection information, representing the occurrence of an interference wave in sub-carrier 8, to the demodulation unit 206 and the wireless communication unit 221. The wireless communication unit 221 transmits the interference wave detection information, output from the interference band detection unit 225, to the transmitter device 12 (step S24).

In the transmitter device 12, the wireless communication unit 127 receives interference wave detection information from the receiver device 22, so that the received interference wave detection information is supplied to the puncture pattern generating unit 124. Upon receiving the interference wave detection information, representing the occurrence of an interference wave in sub-carrier 8, the puncture pattern generating unit 124 assumes that the boundary of an interference band may be disposed among sub-carriers 6-8, thus outputting pattern 4, in which null sub-carriers are set to sub-carriers 6, 7, to the puncturing processing unit 104 (step S25).

The puncturing processing unit 104 sets a null sub-carrier in response to the pattern 4 output from the puncture pattern generating unit 124; the IFFT unit 105 performs an inverse FFT process on a modulation symbol, assigned with a null sub-carrier; the P/S conversion unit 106 performs parallel-serial conversion on the inverse-FFT processed modulation symbol; subsequently, the wireless communication unit 127 transmits the parallel-serial converted modulation symbol to the receiver device 22 (step S26).

In the receiver device 22, the wireless communication unit 221 receives signals transmitted from the transmitter device 12, so that receives signals are processed by the S/P conversion unit 202, the FFT unit 203, and the P/S conversion unit 204 in turn; subsequently, processed signals are supplied to the interference band detection unit 225 and the demodulation unit 206.

The interference band detection unit 225 does not detect reception power, which exceeds the threshold, from a modulation symbol corresponding to sub-carriers 6, 7, which serve as null sub-carriers (step S27), thus outputting interference wave detection information, representing that an interference wave does not exist in sub-carrier 8, to the demodulation unit 206 and the wireless communication unit 221. The wireless communication unit 221 transmits the interference wave detection information, output from the interference band detection unit 225, to the transmitter device 12 (step S28).

Upon completion of transmitting four time slots per one transmitting frame, the timer unit 123 completes counting so as to notify the puncture pattern generating unit 124 of completion of transmitting one transmitting frame (step S29).

Thereafter, the transmitting device 12 operates similarly in accordance with the foregoing steps, wherein determination as to which sub-carrier is set to a null sub-carrier depends on each sub-carrier in which an interference wave is detected.

In the receiver device 22, the timer unit 227 completes counting so as to notify the interference band detection unit 225 of completion of transmitting one transmitting frame (step S29a).

Based on a series of positions, at which an interference wave is detected, in each transmitting frame, the interference band detection unit 225 determines that the boundary of an interference band may be disposed in sub-carrier 8, thus outputting interference band detection information, representing that an interference band overlaps sub-carriers 8-10, to the demodulation unit 206 (step S30).

The demodulation unit 206 performs error correction decoding and demodulation so as to detect bit data without using modulation symbols corresponding to sub-carriers 8-10 in time slots 1-4 (step S31).

As described above, the interference band detection unit 225 of the receiver device 22 feeds back the information, representative of the detected interference wave, to the puncture pattern generating unit 124 of the transmitter device 12; hence, it is possible to efficiently specify an interference band. Upon informed of the occurrence of an interference wave, the puncture pattern generating unit 124 allocates a large number of null sub-carriers; this makes it possible to detect the boundary of an interference band with a small number of times for detecting an interference wave.

The first embodiment and the second embodiment are configured to perform error correction decoding and demodulation by means of the demodulation unit 206 without using modulation symbols susceptible to an interference wave, whereas those modulation symbols can be multiplied by weights and treated as insignificant modulation symbols, whose reliability is lower than modulation symbols corresponding to sub-carriers not susceptible to an interference wave, so that error correction decoding and demodulation can be performed using those modulation symbols. As described above, the operation not using modulation symbols corresponding to sub-carriers susceptible to an interference wave can be achieved by setting zero reliability to those modulation symbols. When modulation symbols are multiplied by weights, weight coefficients can be set to fixed values and varied in response to reception power of the detected interference wave.

It is possible to increase the number of sub-carriers, which serve as null sub-carriers, by reducing a coding ratio in the modulation unit 10. This makes it possible to meticulously detect sub-carriers causing interference waves and an occurrence period of an interference wave in the environment undergoing the frequent occurrence of interference waves; hence, it is possible to improve a tracking ability in the occurrence of an interference wave. Based on a detected degree of interference waves, a receiver device can dynamically determine whether or not the current situation is regarded as the environment undergoing the frequent occurrence of interference waves; subsequently, the result of the determination is fed back to a transmitter device.

The first embodiment and the second embodiment are configured such that the interference band detection units 205, 225 store sub-carriers serving as null sub-carriers, whilst the transmitter devices 10, 11, 12 can be redesigned to transmit control signals incorporating null pattern information representing sub-carriers serving as null sub-carriers. In this case, the null pattern information for setting null sub-carriers can be produced based on reception power of interference waves detected by the interference band detection units 205, 225.

It is possible to incorporate computer systems into transmitter devices and receiver devices according to the first embodiment and the second embodiment. In this case, the process for setting null sub-carriers and the process for detecting an interference band are written in programs and stored in computer-readable storage media, wherein computer systems read and execute programs so as to implement these processes. Herein, computer-readable storage media refer to magnetic disks, magneto-optical disks, CD-ROM, DVD-ROM, semiconductor memory or the like. Computer programs can be distributed to computer systems via communication lines, so that computer systems can implement programs distributed thereto.

Third Embodiment

Figure 9:
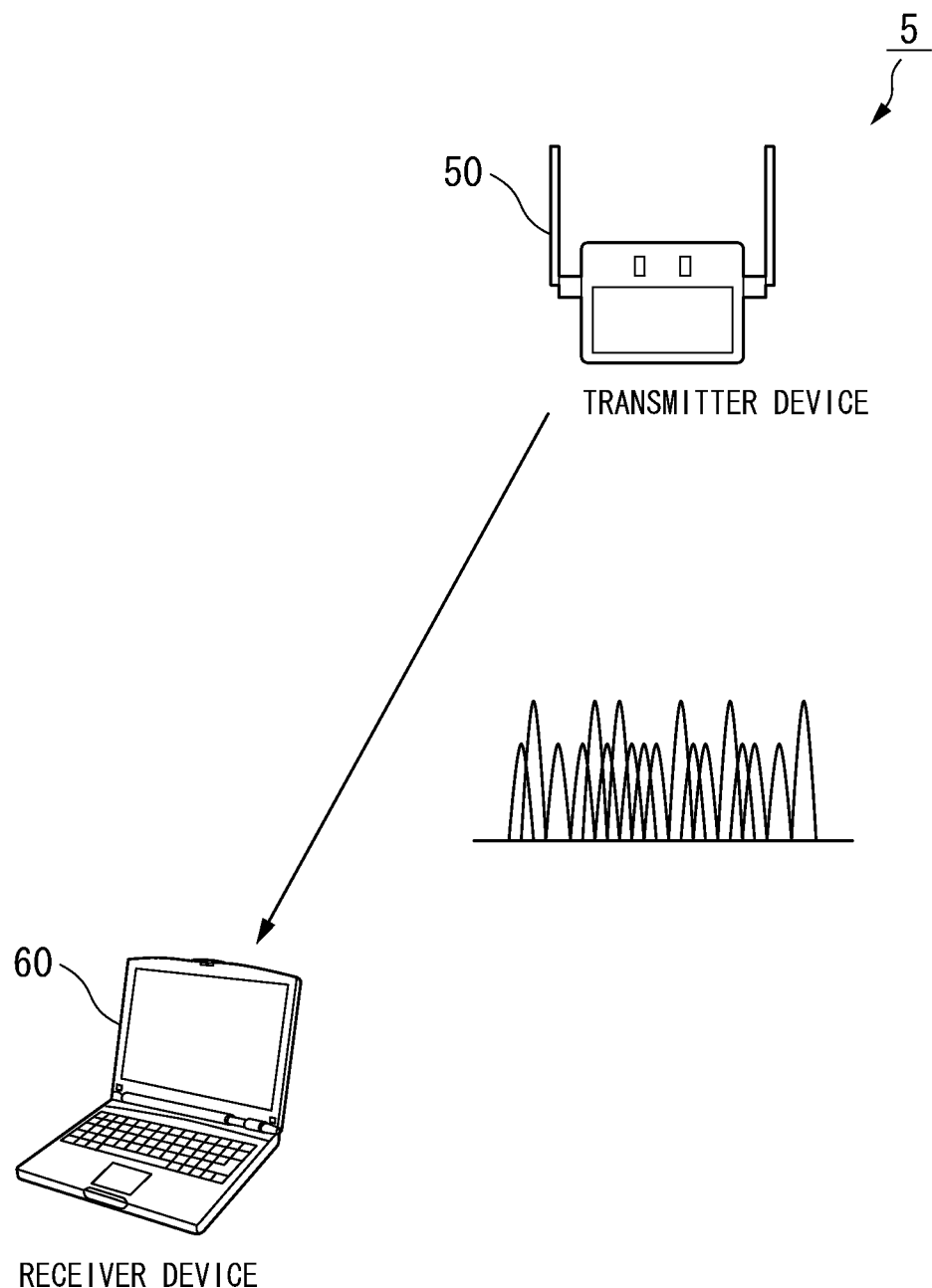
FIG. 9 An illustration showing the overview constitution of a wireless communication system according to a third embodiment, which performs transmission/reception of signals by way of multicarrier transmission.

FIG. 9 is an illustration showing the overview constitution of a wireless communication system 5 according to a third embodiment, which transmits/receives signals by way of multicarrier transmission. The wireless communication system 5 is a wireless communication system of this invention, which includes a transmitter device 50 and a receiver device 60. The number of the transmitter device 50 and the receiver device 60 included in the wireless communication system 5 is necessarily limited to one as shown in FIG. 9; hence, it is possible to incorporate plural devices. In FIG. 9, the transmitter device 50 serves as a base station device whilst the receiver device 60 serves as a wireless communication terminal; however, the transmitter device 50 may serve as a wireless communication terminal while the receiver device 60 may serve as a base station device.

The wireless communication terminal is a terminal device that is able to perform wireless communication with the base station device, wherein the wireless communication terminal exemplarily refers to a wireless LAN (Local Area Network) terminal, a WiMAX (a registered trademark) (Worldwide Interoperability for Microwave Access) terminal or the like. The base station device is a device that is able to perform wireless communication with a plurality of wireless communication terminal, wherein the base station device exemplarily refers to a base station device in a portable telephone network, a wireless LAN router, a WiMAX (a registered trademark) base station or the like. The transmitter device 50 and the receiver device 60 perform wireless communication by way of a multicarrier transmission method. Specifically, the transmitter device 50 and the receiver device 60 perform wireless communication by way of OFDM (Orthogonal Frequency Division Multiplexing).

Figure 10:
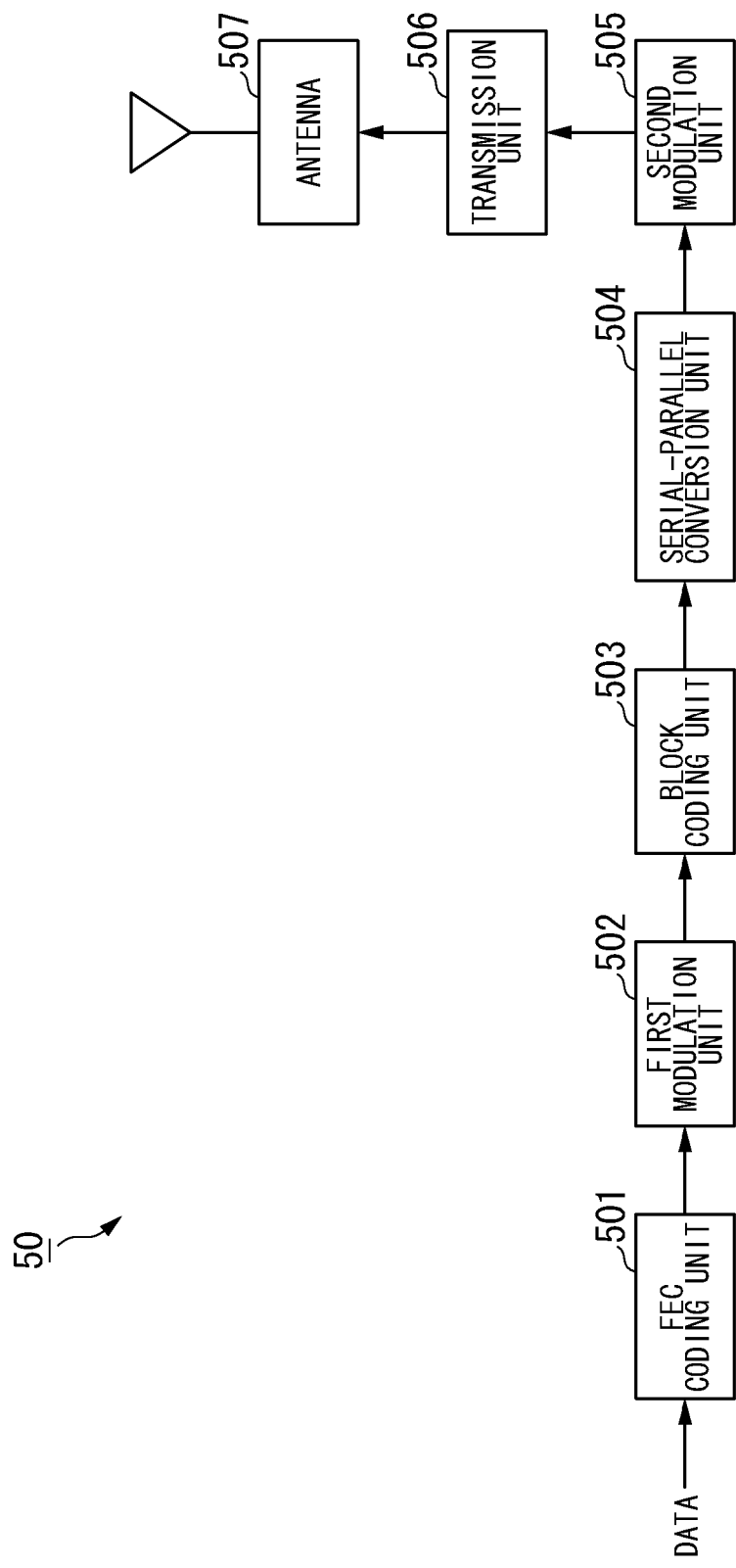
FIG. 10 A block diagram showing the functional constitution of the transmitter device according to the third embodiment.

FIG. 10 is a block diagram showing the functional constitution of the transmitter device 50 of this embodiment. In this diagram, the transmitter device 50 includes an FEC coding unit 504, a first modulation unit 502, a block coding unit 503, a serial-parallel conversion unit 504, a second modulation unit 505, a transmission unit 506, and an antenna 507.

The FEC coding unit 501 performs error correction coding on bit strings of transmitting data according to the FEC (Forward Error Correction), thus generating error-correction coded bits.

The first modulation unit 502 performs a modulation process (a mapping process) on error-correction coded bits, thus generating a plurality of modulation symbols. The first modulation unit 502 performs a modulation process according to BPSK (Binary Phase Shift Keying), QPSK (Quadrature Phase Shift Keying), or 8 PSK (Octuple Phase Shift Keying), for example, thus generating combinations (modulation symbols) of amplitude values and phase values based on error-correction coded bits.

The block coding unit 503 performs a block coding process on modulation symbols generated by the first modulation unit 502. The block coding unit 503 adopts a block coding method which allows for reversible calculation (block decoding) and by which a part of block-coded signals becomes zero in amplitude. For instance, the block coding unit 503 performs a block coding process using Hadamard matrix of Equation 1, which is one type of orthogonal matrix. In Equation 1, $d_1$, $d_2$ denote modulation symbols, and $b_1$, $b_2$ denote modulation symbols after completion of block coding (block-coded modulation symbols). In this connection, the block coding unit 503 does not necessarily use Hadamard matrix but use M-series or scramble codes.

$$\begin{bmatrix} b_1 \\ b_2 \end{bmatrix} = \begin{bmatrix} 1 & 1 \\ 1 & -1 \end{bmatrix} \begin{bmatrix} d_1 \\ d_2 \end{bmatrix} \quad \text{(Equation 1)}$$

Figure 11:
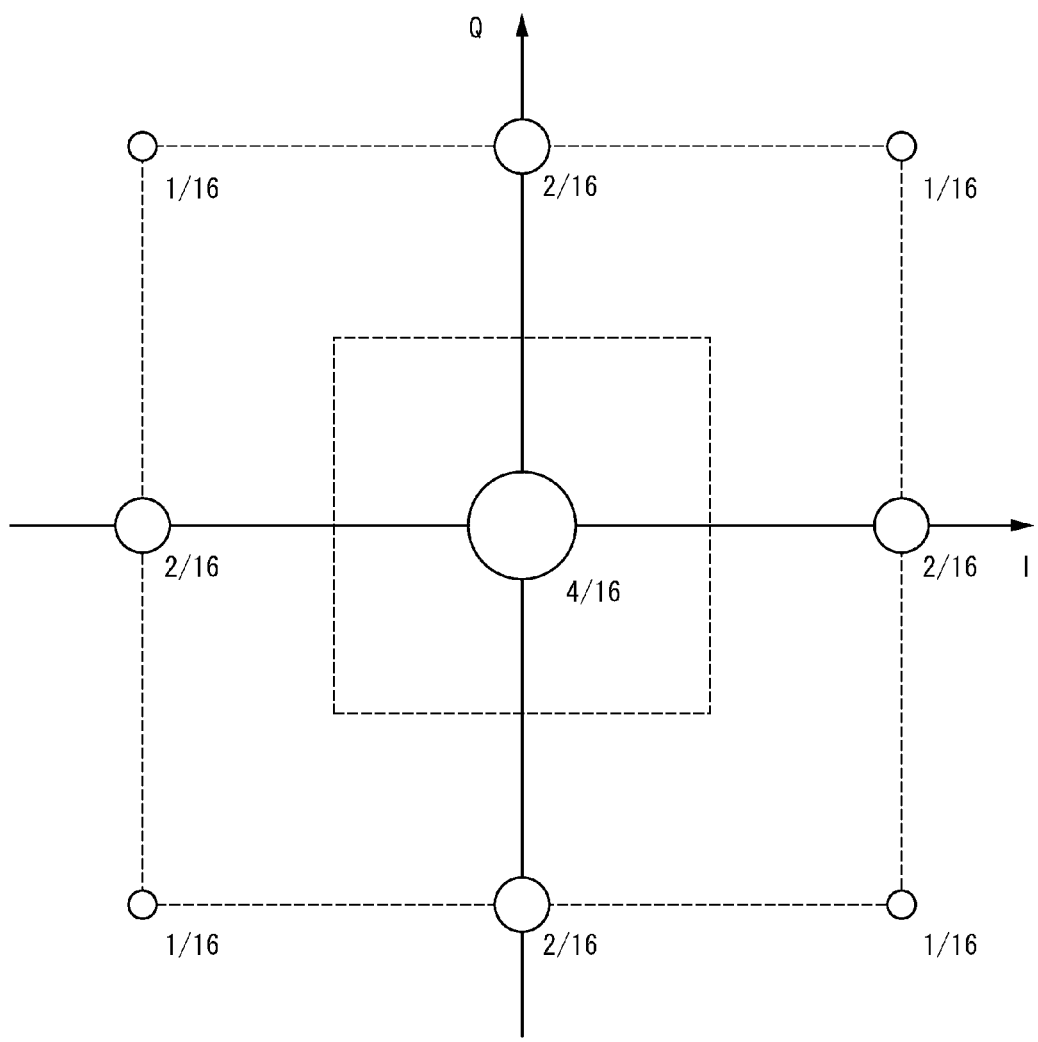
FIG. 11 An illustration showing an occurrence probability of constellation points after completion of block coding according to the third embodiment.

FIG. 11 is an illustration showing the occurrence probability of constellation points after block coding, wherein the vertical axis Q represents orthogonal elements, and the horizontal axis I represents common-mode elements. FIG. 11 shows an example in which modulation symbols modulated with isoelectric power QPSK (four constellation points) are subjected to block coding using 2×2 Hadamard matrix. In this case, there are sixteen combinations of modulation symbols $d_1$, $d_2$. In addition, there are nine types of constellation points with respect to block-coded modulation symbols $b_1$, $b_2$, among which the occurrence probability of constellation points (0,0) demonstrating zero amplitude is 25%.

Referring back to FIG. 10, we will continue discussion on the transmitter device 50. The serial-parallel conversion unit 504 performs serial-parallel conversion on a plurality of block-coded modulation symbols generated by the block coding unit 503.

The second modulation unit 505 allocates block-coded modulation symbols, which are cascaded by the serial-parallel conversion unit 504, to sub-carriers, wherein the second modulation unit 505 generates modulation signals by way of IFFT (Inverse Fast Fourier Transform), parallel-serial conversion and guard-interval insertion.

The transmission unit 506 performs digital-analog conversion, power amplification and up-conversion on modulation signals, thus generating transmitting signals.

The antenna 507 transmits transmitting signals, generated by the transmission unit 506, via wireless transmission.

Figure 12A:
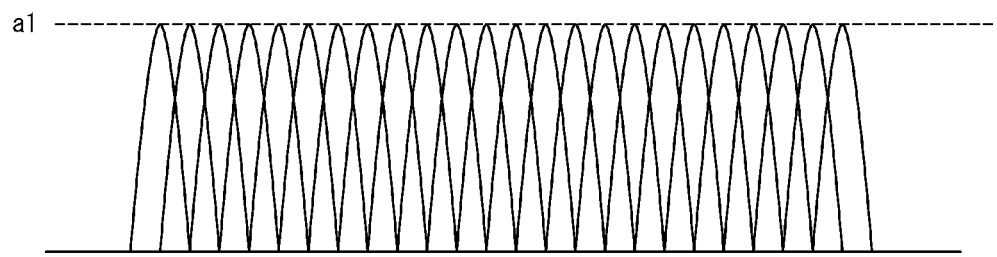
FIG. 12A An illustration representative of transmitting signals.
Figure 12B:
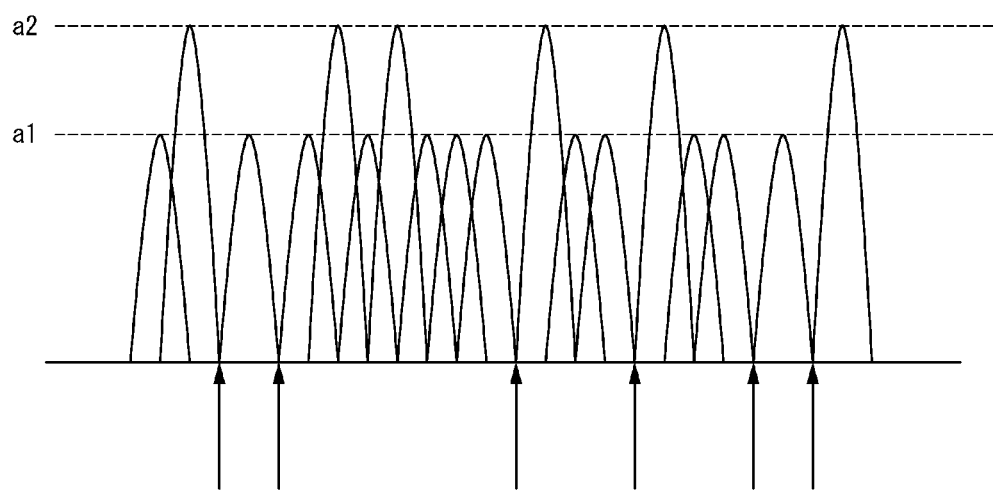
FIG. 12B An illustration representative of transmitting signals.

FIGS. 12A and 12B are illustrations representative of transmitting signals. In FIG. 12A, the horizontal axis represents frequency, and the vertical axis represents amplitude. FIG. 12A shows transmitting signals generated according to the foregoing multicarrier method (QPSK modulation, OFDM), while FIG. 12B shows transmitting signals generated by the transmitter device 50.

In FIG. 12A, an amplitude a1 is uniformly applied to a plurality of sub-carriers, which do not include sub-carriers having zero amplitude (hereinafter, those sub-carriers will be referred to as "null sub-carriers").

In contrast, FIG. 12B shows the coexistence of sub-carriers having a relatively large amplitude a2, sub-carriers having a relatively small amplitude a1, and null sub-carriers having zero amplitude. In FIG. 12B, null sub-carriers are disposed in frequency bands denoted by upward arrows so that those sub-carriers are allocated with block-coded modulation symbols whose amplitudes become zero via the block coding unit 503.

Next, the operation and procedure of the transmitter device 50 will be described. FIG. 13 is a flowchart showing a transmitting procedure of the transmitter device 50.

As shown in FIG. 13, the FEC coding unit 501 performs error correction coding on bit strings of transmitting data in accordance with the FEC procedure, thus generating error-correction coded bits (step S101). Next, the first modulation unit 502 modulates error-correction coded bits so as to generate modulation symbols (step S102). Next, the block coding unit 503 performs a block coding process on modulation symbols modulation symbols (step S103). Next, the serial-parallel conversion unit 504 performs serial-parallel conversion on block-coded modulation symbols (step S104). Next, the second modulation unit 505 performs an IFFT procedure (step S105), thus achieving parallel-serial conversion and guard-interval insertion (step S106). Next, the transmission unit 506 generates transmitting signals (step S107). Subsequently, the antenna 507 transmits signals via wireless transmission (step S108), thus completing the transmitting procedure shown in this flowchart.

Next, the functional constitution of the receiver device 60 will be described.

Figure 14:
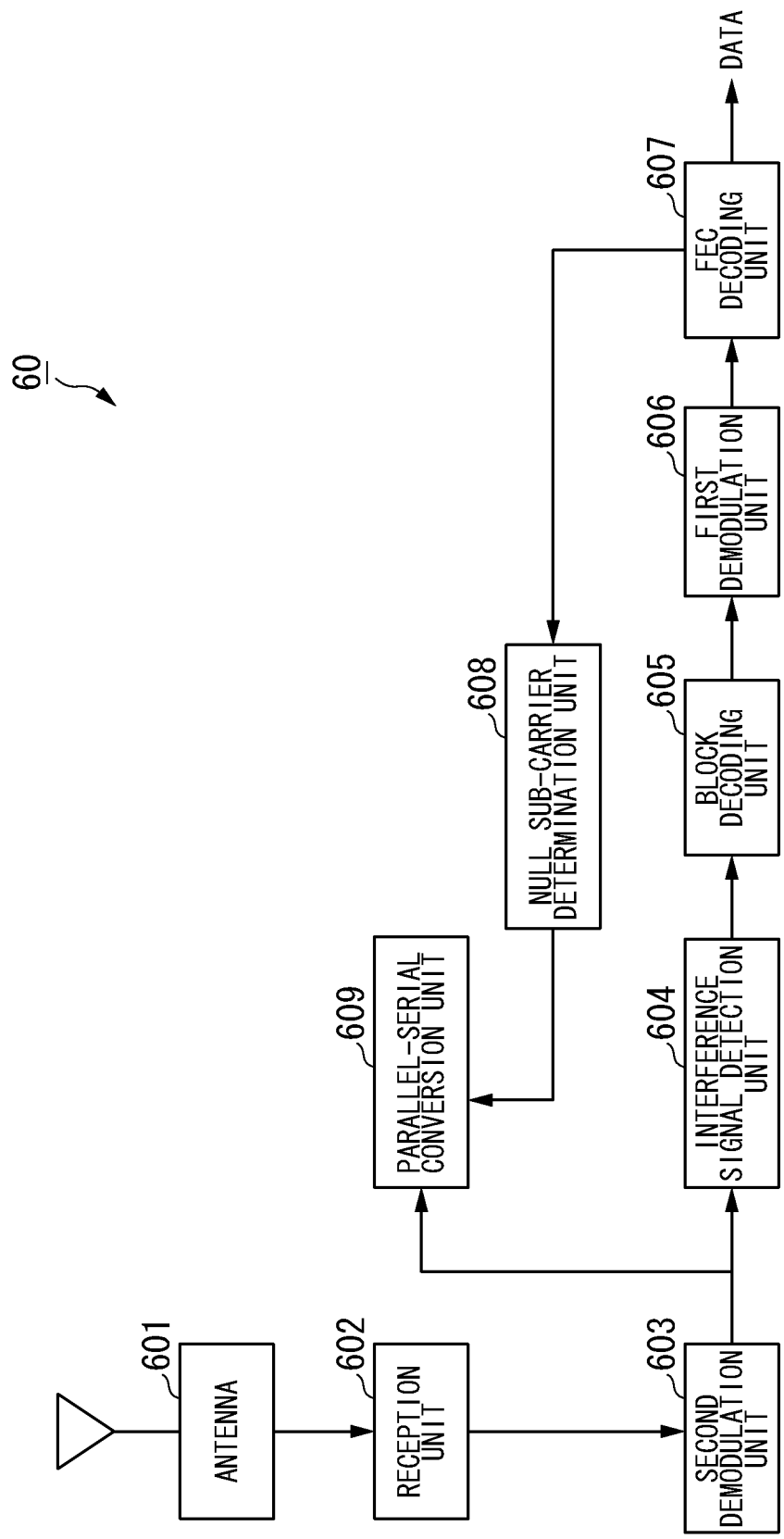
FIG. 14 A block diagram showing the functional constitution of the receiver device according to the third embodiment.

FIG. 14 is a block diagram showing the functional constitution of the receiver device 60 in this embodiment. In this diagram, the receiver device 60 includes an antenna 601, a reception unit 602, a second modulation unit 603, a parallel-serial conversion unit 604, a block decoding unit 605, a first demodulation unit 606, an FEC decoding unit 607, a null sub-carrier determination unit 608, and an interference signal detection unit 609.

The antenna 601 receives signals combining signals transmitted by the transmitter device 50 and interference signals transmitted by another transmitter device.

The reception unit 602 performs down-conversion and analog-digital conversion on received signals, thus generating modulation signals.

The second modulation unit 603 performs guard-interval removal, serial-parallel conversion, FFT (Fast Fourier Transform), and frequency-domain equalization using preamble information on modulation signals, thus generating a plurality of block-coded modulation symbols.

The parallel-serial conversion unit 604 performs parallel-serial conversion on a plurality of block-coded modulation symbols which are cascaded to each other.

The block decoding unit 605 performs a block decoding process, which is commensurate to a block coding process of the block coding unit 503 of the transmitter device 50, on block-coded modulation symbols, thus reproducing modulation symbols. In the case where the block coding unit 503 performs a block coding process using a Hadamard matrix according to Equation 1, for example, the block decoding unit 605 performs a block decoding process using an inverse matrix of a Hadamard matrix according to Equation 2.

$$\begin{bmatrix} d_1 \\ d_2 \end{bmatrix} = \begin{bmatrix} 1 & 1 \\ 1 & -1 \end{bmatrix}^{-1} \begin{bmatrix} b_1 \\ b_2 \end{bmatrix} \quad \text{(Equation 2)}$$

The first demodulation unit 606 performs demodulation (de-mapping process), which is commensurate to modulation of the first modulation unit 502 of the transmitter device 50, on modulation symbols, thus generating error-correction coded bits.

The FEC decoding unit 607 performs error correction and decoding on error-correction coded bits by way of FEC, thus reproducing original data subjected to transmission.

The null sub-carrier determination unit 608 identifies frequency bands allocating null sub-carriers in transmitting signals. Specifically, the null sub-carrier determination unit 608 performs processing, similar to the processing implemented by the FEC coding unit 501, the first modulation unit 502 and the block coding unit 503 of the transmitter device 50, on output data of the FEC decoding unit 607, thus generating replica signals and identifying frequency bands (hereinafter, referred to as "null frequency bands") allocated to null sub-carriers.

The interference signal detection unit 609 measures signal components of null frequency bands from received signals, thus detecting interference signals. For instance, the interference signal detection unit 609 measures amplitudes of signal components of null sub-carriers from received signals, wherein the interference signal detection unit 609 detects the occurrence of an interference signal in each null frequency band when the measurement result is higher than a predetermined threshold. In addition, the interference signal detection unit 609 may store detection result, indicating the occurrence/absence of a interference signal in each null frequency band and an amplitude of a detected interference signal, in connection with each frequency band. In this case, upon retrieving detection results with respect to all the frequency bands in signals received by the receiver device 60, the interference signal detection unit 609 may output detection results of frequency bands, which are stored, as detection results of interference signals.

Figure 15:
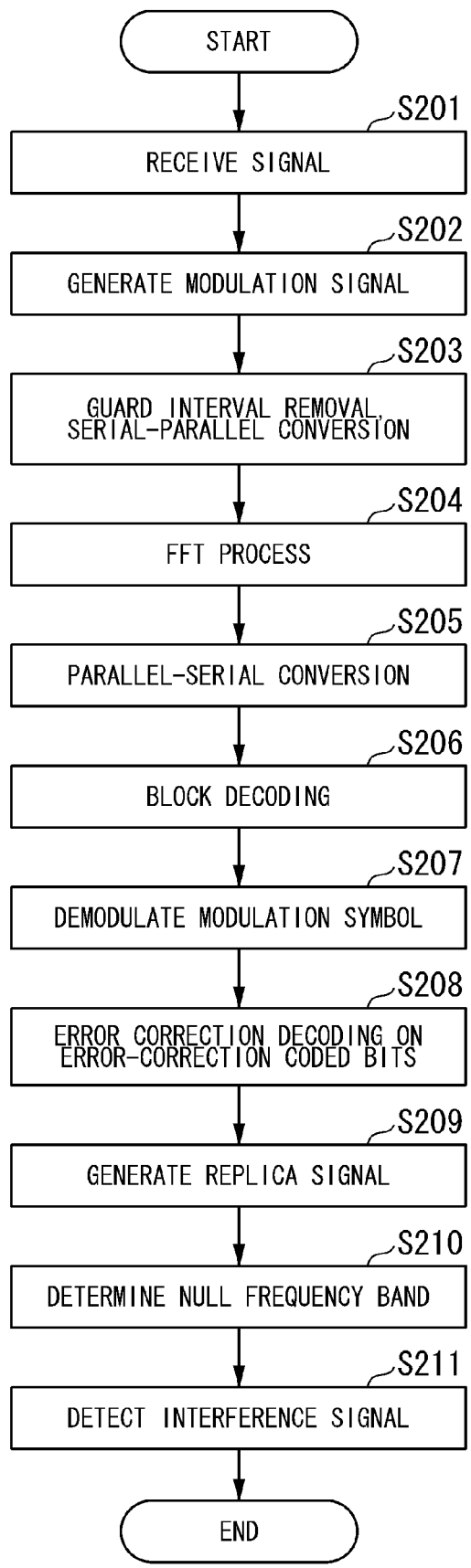
FIG. 15 A flowchart illustrating a receiving procedure of the receiver device according to the third embodiment.

Next, the operation and procedure of the receiver device 60 will be described. FIG. 15 is a flowchart showing the receiving procedure of the receiver device 60.

In FIG. 15, the antenna 601 receives signals (step S201), so that the reception unit 602 reproduces modulation signals from received signals (step S202). Next, the second demodulation unit 603 performs guard-interval removal and serial-parallel conversion on modulation signals (step S203). Next, the second demodulation unit 603 generates block-coded modulation symbols by way of FFT (step S204). Next, the parallel-serial conversion unit 604 performs parallel-serial conversion on block-coded modulation symbols (step S205). Next, the block decoding unit 605 performs block decoding on block-coded modulation symbols, thus reproducing modulation symbols (step S206). Next, the first demodulation unit 606 demodulates modulation symbols so as to generate error-correction coded bits (step S207). Next, the FEC decoding unit 607 performs error correction decoding on error-correction coded bits, thus reproducing original data subjected to transmission (step S208).

Next, the null sub-carrier determination unit 608 generates replica signals (step S209) so as to identify null frequency bands (step S210). Next, the interference signal detection unit 609 detects an interference signal in each null frequency band (step S211).

Since the wireless communication system 5 is configured such that the block coding unit 503 of the transmitter device 50 performs a block coding process, it is unnecessary to deliberately incorporate null sub-carriers not including transmitting data, but it is possible to generate null sub-carriers incorporating a part of transmitting data in transmitting signals. For this reason, it is possible to generate transmitting signals having null sub-carriers without reducing the amount of data included in transmitting signals. Therefore, the receiver device 60 identifies frequency bands of null sub-carriers (null frequency bands) so as to measure signals in those frequency bands; thus, it is possible to precisely detect interference signals while preventing degradation of data transmission efficiency.

In the wireless communication system 5 having this constitution, the receiver device 60 is allowed to detect and measure interference signals in null frequency bands alone. However, frequency bands of null sub-carriers which occur in transmitting signals are not fixed but are varied for each transmitting signal; hence, the receiver device 60 needs to receive transmitting signals multiple times and detect interference signals, whereby it is possible to detect interference signals in the entire frequency range used in the wireless communication system 5 and the receiver device 60.

The conventional technology, which measures interference signals by use of non-transmission intervals of burst transmission or null signal intervals deliberately interposed in data intervals, suffers from a problem due to a bad tracking ability in reacting to fluctuations of characteristics of transmission paths due to intermittently implemented measurement on interference signals. Considering such a problem, the wireless communication system 5 is configured such that the transmitter device 50 normally performs a block coding process so as to generate transmitting signals, thus improving a tracking ability in reacting to fluctuating characteristics of transmission paths.

Variation of Third Embodiment

Figure 16:
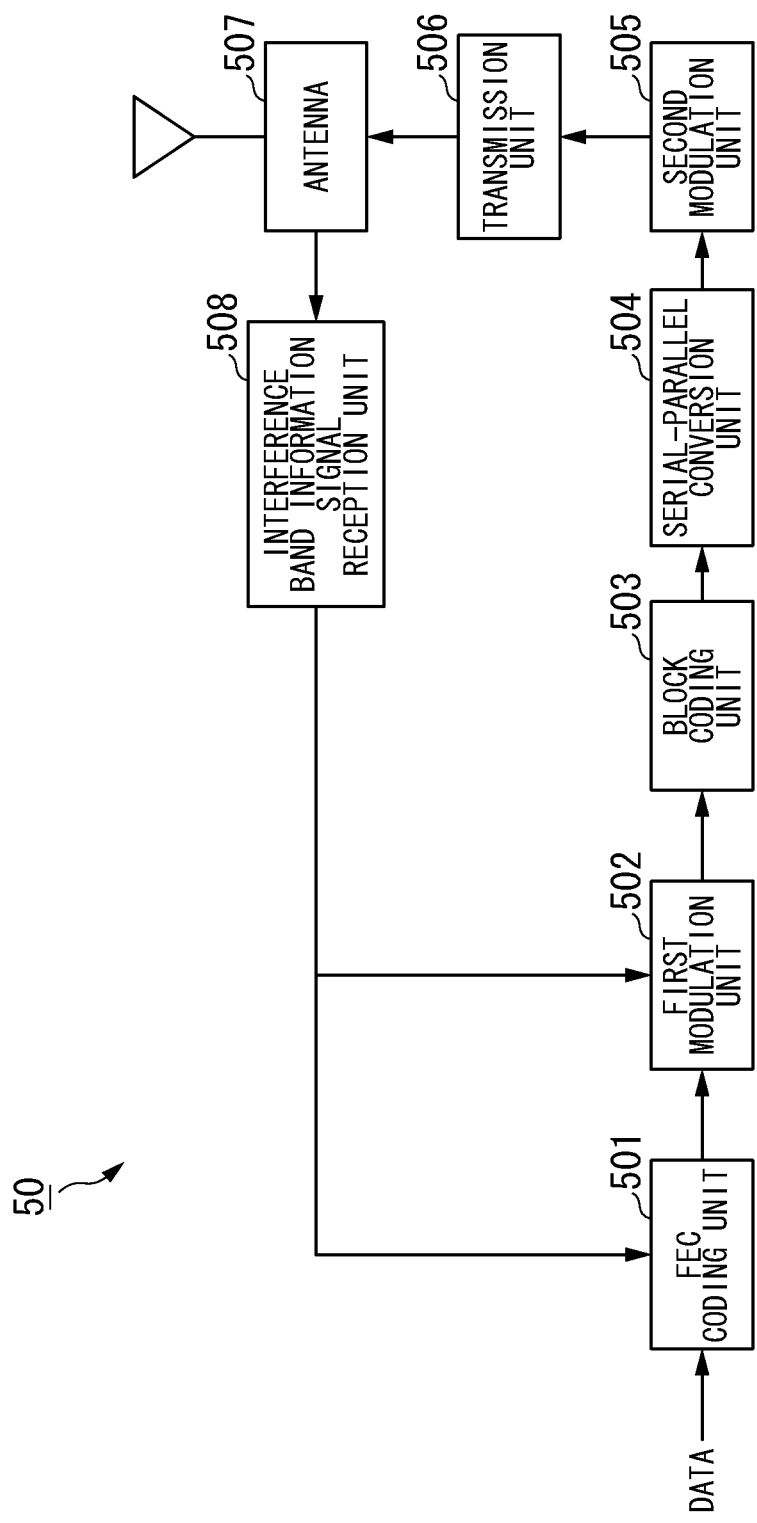
FIG. 16 A block diagram showing the functional constitution of a transmitter device according to a variation of the third embodiment.
Figure 17:
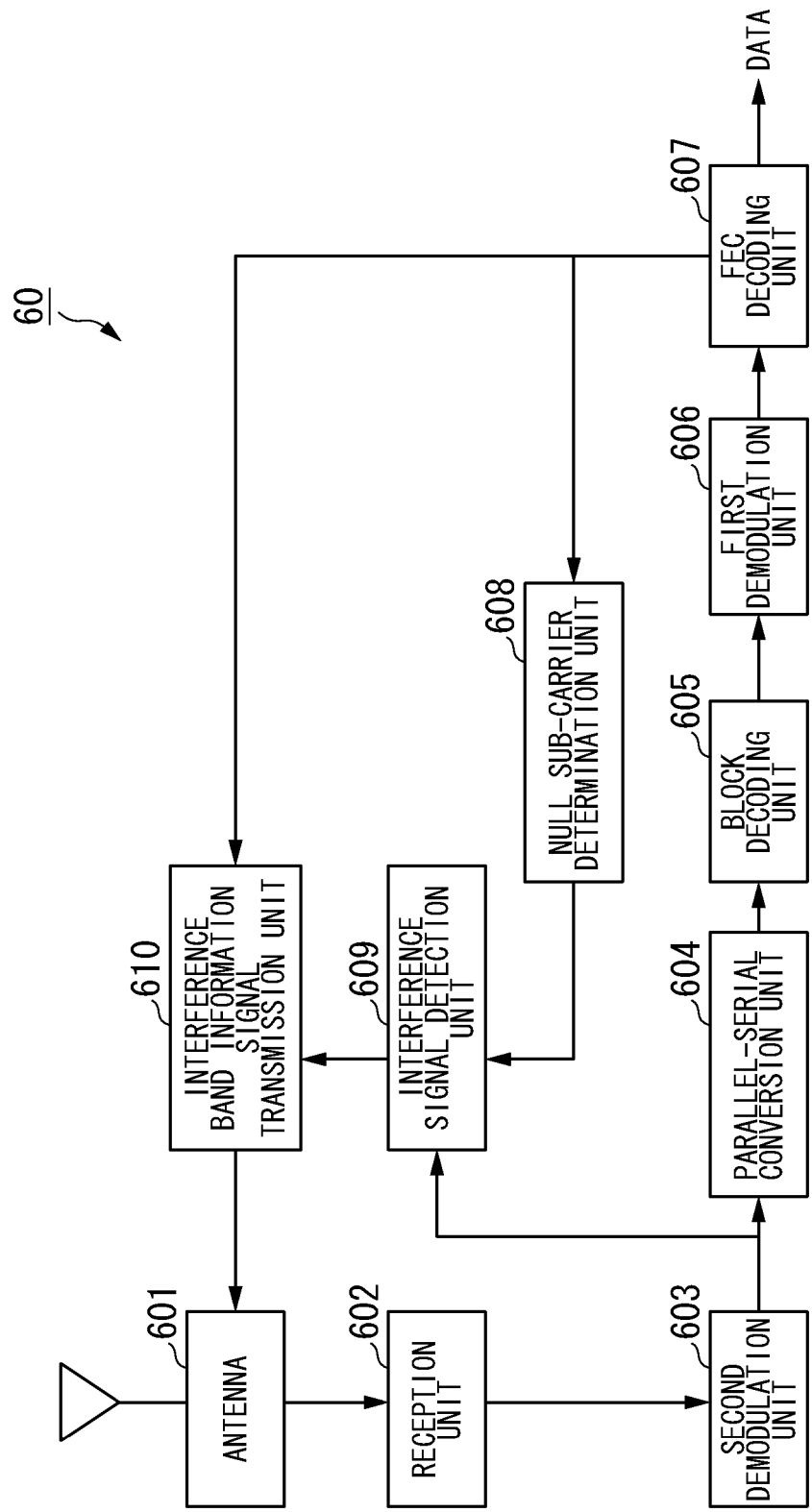
FIG. 17 A block diagram showing the functional constitution of a receiver device according to a variation of the third embodiment.
Figure 18:
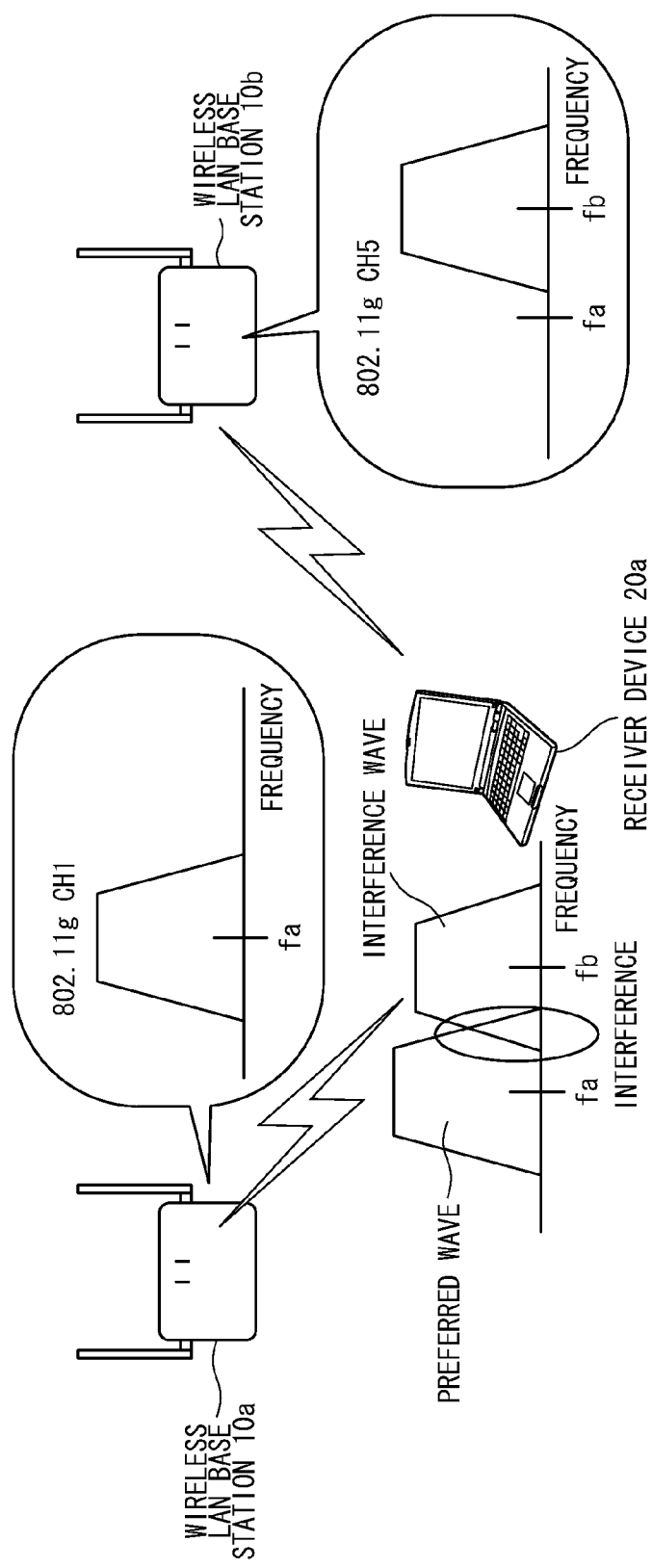
FIG. 18 A conceptual illustration showing the overall system constitution, which is one example of a combination of wireless communication systems sharing frequency bands.

FIGS. 16 and 17 are block diagrams showing the functional constitutions of the transmitter device 50 and the receiver device 60 included in the wireless communication system 5 according to a variation of the third embodiment. The transmitter device 50 can be redesigned to further include an interference band information signal reception unit 508. The receiver device 60 can be redesigned to further include an interference band information signal transmission unit 610. In this case, the transmitter device 50 receives interference band information transmitted by the receiver device 60 so as to operate based on the interference band information. Hereinafter, the transmitter device 50 and the receiver device 60 having the above constitutions will be described.

The interference band information signal transmission unit 610 generates interference band information based on the detection result of the interference signal detection unit 609. The interference band information is information regarding an interference signal which occurs during wireless communication between the transmitter device 50 and the receiver device 60. For instance, the interference band information is information representative of sub-carriers already undergoing interference or information representative of amplitude of an interference signal. The interference band information may include information of an error ratio calculated in error correction decoding of the FEC decoding unit 607. The interference band information signal transmission unit 610 performs error correction coding, modulation, digital-analog conversion and up-conversion on the interference band information so as to generate wireless signals (interference band information signals), which are subsequently transmitted to the transmitter device 50 via the antenna 601.

The interference band information signal reception unit 508 performs down-conversion, analog-digital conversion, demodulation and error correction decoding on interference band information signals, which are received by the antenna 507, thus retrieving interference band information from interference band information signals.

According to this variation of the third embodiment, the FEC coding unit 501 performs adaptive modulation based on an error ratio included in interference band information, thus changing a coding ratio thereof. The adaptive modulation can be implemented using the existing technology. For instance, the FEC coding unit 501 decreases a coding ratio thereof to be lower than the currently applied coding ratio so as to increase resistance to interference when the error ratio is high, whilst the FEC coding unit 501 increases a coding ratio thereof to be higher than the currently applied coding ratio so as to decrease resistance to interference when the error ratio is low.

According to this variation of the third embodiment, the first modulation unit 502 performs adaptive modulation based on an error ratio included in interference band information, thus generating a plurality of modulation symbols. The adaptive modulation can be implemented using the existing technology. For instance, the first modulation unit 502 generates modulation symbols in accordance with a modulation method having a high resistance to interference, whose multi-valued degree of modulation is lower than the currently applied modulation method, when the error ratio is high, whilst the first modulation unit 502 generates modulation symbols in accordance with a modulation method having a low resistance to interference, whose multi-valued degree of modulation is higher than the currently applied modulation method, when the error ratio is low.

According to the third embodiment and the variation of the third embodiment, the transmitter device 50 does not deliberately interpose sub-carriers having zero amplitude which do no include transmitting data but generates sub-carriers having zero amplitude which share a part of transmitting data. The receiver device 60 detects interference signals, which are commensurate to signals having frequency bands of sub-carriers having zero amplitude in the transmitter device 50, from received signals. For this reason, this invention is able to detect interference signals while preventing degradation of data transmission efficiency.

In the above description, detection result of interference signals in the receiver device 60 is used to generate interference band information signals which are sent to the transmitter device 50, whereas detection result of interference signals is not necessarily limited to this utilization and therefore can be applied to other utilizations. For instance, the receiver device 60 can be reconfigured to perform demodulation in response to interference signals by feeding back detection result of interference signals to the second demodulation unit 603, thus improving a demodulation precision.

Heretofore, various embodiments of this invention have been described in detail with reference to the drawings; however, the specific constitution is not necessarily limited to these embodiments; hence, this invention may embrace design choices which do not deviate from the essential matter of this invention.

| DESCRIPTION OF THE REFERENCE NUMERALS | |
|---|---|
| 1, 3, 5 | Wireless communication system |
| 10, 12, 50 | Transmitter device |
| 10a, 10b | Wireless LAN base station |
| 20, 22, 20a, 60 | Receiver device |
| 101 | Modulation unit |
| 102 | S/P conversion unit |
| 103 | Puncture pattern generating unit |
| 104 | Puncturing processing unit |
| 105 | IFFT unit |
| 106 | P/S conversion unit |
| 107 | Wireless communication unit |
| 123 | Timer unit |
| 124 | Puncture pattern generating unit |
| 127 | Wireless communication unit |
| 201 | Wireless communication unit |
| 202 | S/P conversion unit |
| 203 | FFT unit |
| 204 | P/S conversion unit |
| 205 | Interference band detection unit |
| 206 | Demodulation unit |

DESCRIPTION OF THE REFERENCE NUMERALS

| | |
|---|---|
| 221 | Wireless communication unit |
| 225 | Interference band detection unit |
| 227 | Timer unit |
| 501 | FEC coding unit |
| 502 | First modulation unit |
| 503 | Block coding unit |
| 504 | Serial-parallel conversion unit |
| 505 | Second modulation unit |
| 506 | Transmission unit |
| 507, 601 | Antenna |
| 508 | Interference band information signal reception unit |
| 602 | Reception unit |
| 603 | Second demodulation unit |
| 604 | Parallel-serial conversion unit |
| 605 | Block decoding unit |
| 606 | First demodulation unit |
| 607 | FEC decoding unit |
| 608 | Null sub-carrier determination unit |
| 609 | Interference signal detection unit |
| 610 | Interference band information signal transmission unit |

The invention claimed is:

1. A wireless communication system performing wireless communication between a transmitter device and a receiver device according to a multicarrier multiplexing transmission method, said wireless communication system characterized in that
the transmitter device performs error-correction coding on transmitting data and sets a plurality of null subcarriers, having zero amplitude, among a plurality of subcarriers, which are allocated to transmission of data produced by error-correction coding so as to configure each transmission frame set for each time slot, in accordance with a predetermined null pattern facilitating estimation of an interference wave, thus transmitting all data produced by the error-correction coding via the plurality of subcarriers without decreasing transmission speed,
while the receiver device performs error-correction decoding on received signals from the transmitter device so as to reproduce the transmitting data, wherein upon detecting reception power exceeding a threshold in the null subcarrier for each transmission frame, the receiver device determines that an interference wave occurs in the transmission frame.

2. The wireless communication system according to claim 1, wherein the subcarrier serving as the null subcarrier is changed in each time slot delimited by a predetermined time interval according to the predetermined null pattern.

3. The wireless communication system according to claim 1, wherein it is determined which subcarrier among the plurality of subcarriers is designated as the null subcarrier in advance according to the predetermined null pattern.

4. The wireless communication system according to claim 2, wherein the null subcarrier is determined in an order counting from a subcarrier having a highest frequency to a subcarrier having a center frequency among the plurality of subcarriers,
while the null subcarrier is determined in an order counting from a subcarrier having a lowest frequency to the subcarrier having the center frequency among the plurality of subcarriers.

5. The wireless communication system according to claim 2, wherein one of the plurality of subcarriers is randomly designated as the null subcarrier.

6. The wireless communication system according to claim 1, wherein the number of null subcarriers selected from among the plurality of subcarriers is determined based on a coding ratio of forward error coding or characteristics of a transmission path established between the transmitter device and the receiver device.

7. The wireless communication system according to claim 1, wherein the receiver device transmits interference wave detection information, representing the subcarrier in which the interference wave is detected, to the transmitter device,
while the transmitter device sets the null subcarrier based on the interference wave detection information transmitted thereto.

8. The wireless communication system according to claim 1, wherein said receiver device estimates, based on the interference wave detection information during consecutive time slots, which subcarrier among the plurality of subcarriers undergoes the interference wave in any one of the consecutive time slots, so that the receiver device demodulates transmitted data without using a modulation symbol assigned to the subcarrier undergoing the interference wave.

9. The wireless communication system according to claim 1, wherein the transmitter device includes
a modulation unit, adopting forward error-correction coding on transmitting data, which modulates forward error-correction coded transmitting data so as to output modulation signals, and
a puncturing processing unit that applies zero transmission power to a modulation signal, which is assigned to the subcarrier serving as the null subcarrier among the plurality of subcarriers, among the modulation signals output from the modulation unit.

10. The wireless communication system according to claim 1, wherein the receiver device discards a received signal, corresponding to the subcarrier serving as the null subcarrier, as an invalid signal, thus performing demodulation and error-correction decoding without using the received signal.

11. The wireless communication system according to claim 2, wherein it is determined which subcarrier among the plurality of subcarriers is designated as the null subcarrier in advance according to the predetermined null pattern.

12. The wireless communication system according to claim 3, wherein the null subcarrier is determined in an order counting from a subcarrier having a highest frequency to a subcarrier having a center frequency among the plurality of subcarriers,
while the null subcarrier is determined in an order counting from a subcarrier having a lowest frequency to the subcarrier having the center frequency among the plurality of subcarriers.

13. The wireless communication system according to claim 3, wherein one of the plurality of subcarriers is randomly designated as the null subcarrier.

14. The wireless communication system according to claim 2, wherein the receiver device transmits interference wave detection information, representing the subcarrier in which the interference wave is detected, to the transmitter device,
while the transmitter device sets the null subcarrier based on the interference wave detection information transmitted thereto.

15. A wireless communication system performing wireless communication between a transmitter device and a receiver device according to a multicarrier multiplexing transmission method characterized in that
the transmitter device includes
a first modulation unit that modulates input bits to generate a plurality of modulation symbols, a block coding unit that performs block coding on the plurality of modulation symbols, a part of which becomes zero in amplitude, a second modulation unit that allocates block-coded modulation symbols to subcarriers so as to generate modulation signals, and a transmission unit that generates and outputs transmitting signals based on modulation signals, while the receiver device includes a reception unit that receives signals transmitted thereto, a second demodulation unit that retrieves modulation symbols, which are subjected to block coding in units of subcarriers, from received signals, a block decoding unit that performs block decoding, which is reverse to block coding of the block coding unit, on block-coded modulation symbols, a first demodulation unit that performs demodulation, which is reverse to modulation of the first modulation unit, on block-decoded modulation symbols, a decision unit that identifies a frequency band of the subcarrier having zero amplitude in transmitting signals generated by the transmission unit based on transmitted data, and a detection unit that detects an interference signal representative of a signal having the frequency band of the subcarrier having zero amplitude, identified by the decision unit, among received signals transmitted thereto.

16. The wireless communication system according to claim 15, wherein the decision unit performs error-correction coding which is identical to the error-correction coding of the error-correction coding unit, performs modulation which is identical to the modulation of the first modulation unit, and performs block coding which is identical to the block coding of the block coding unit on transmitted data, thus identifying the frequency band of the subcarrier having zero amplitude among transmitting signals generated by the transmission unit.

17. The wireless communication system according to claim 15, wherein the receiver device further includes an interference band information signal transmission unit that generates interference band information representative of the subcarrier undergoing the interference wave based on the detected interference signal so as to transmit the interference band information to the transmitter device, and wherein the first modulation unit or the error-correction coding unit of the transmitter device determines a modulation method or a coding ratio based on the interference band information.

18. The wireless communication system according to claim 16, wherein the receiver device further includes an interference band information signal transmission unit that generates interference band information representative of the subcarrier undergoing the interference wave based on the detected interference signal so as to transmit the interference band information to the transmitter device, and wherein the first modulation unit or the error-correction coding unit of the transmitter device determines a modulation method or a coding ratio based on the interference band information.

19. A wireless communication method performing wireless communication between a transmitter device and a receiver device according to a multicarrier multiplexing transmission method, said wireless communication method characterized in that the transmitter device performs error-correction coding on transmitting data and sets a plurality of null subcarriers, having zero amplitude, among a plurality of subcarriers, which are allocated to transmission of data produced by error-correction coding so as to configure each transmission frame set for each time slot, in accordance with a predetermined null pattern facilitating estimation of an interference wave, thus transmitting all data produced by error-correction coding via the plurality of subcarriers without decreasing transmission speed, while the receiver device performs error-correction decoding on received signals from the transmitter device so as to reproduce the transmitting data, wherein upon detecting reception power exceeding a threshold in the null subcarrier for each transmission frame, the receiver device determines that an interference wave occurs in the transmission frame.

\* \* \* \* \*